United States Patent [19]
Hart et al.

[11] Patent Number: 5,675,437
[45] Date of Patent: Oct. 7, 1997

[54] LIGHT CONTROL FILM FOR USE IN VIEWING HOLOGRAMS AND RELATED METHOD

[75] Inventors: Stephen J. Hart, San Juan Capistrano; Ken Mailand, Laguna Hills, both of Calif.

[73] Assignee: Voxel, Laguna Hills, Calif.

[21] Appl. No.: 649,595

[22] PCT Filed: Nov. 28, 1994

[86] PCT No.: PCT/US94/13639

§ 371 Date: Aug. 30, 1996

§ 102(e) Date: Aug. 30, 1996

[87] PCT Pub. No.: WO95/14960

PCT Pub. Date: Jun. 1, 1995

Related U.S. Application Data

[63] Continuation-in-part of Ser. No. 982,316, Nov. 27, 1992, abandoned, and a continuation-in-part of Ser. No. 454,381, Sep. 11, 1995.

[51] Int. Cl.$^6$ .................... G02B 27/44; G02B 26/08; G02B 26/02; G02B 5/18

[52] U.S. Cl. .................... 359/566; 359/567; 359/32; 359/22; 359/613; 359/232; 359/233; 359/460; 359/894

[58] Field of Search .................... 359/566, 567, 359/576, 22, 24, 32, 613, 460, 232, 233, 893, 894

[56] References Cited

U.S. PATENT DOCUMENTS

| | | | |
|---|---|---|---|
| 2,511,590 | 6/1950 | Keck | 359/613 |
| 3,037,419 | 6/1962 | Nixon | 359/613 |
| 3,444,419 | 5/1969 | Karoll | 359/614 |
| 3,751,658 | 8/1973 | Arnold | 359/614 |
| 3,944,322 | 3/1976 | Benton | 359/32 |
| 4,623,214 | 11/1986 | Bazargan | 359/24 |
| 4,623,215 | 11/1986 | Bazargan | 359/32 |
| 5,048,925 | 9/1991 | Gerritsen et al. | 359/569 |

*Primary Examiner*—Jon W. Henry
*Attorney, Agent, or Firm*—Snell & Wilmer L.L.P.

[57] ABSTRACT

An apparatus for reconstructing holographic images includes a white light source, diffraction grating (1112) for generating zero-order diffracted light (1416) and at least first-order diffracted light, and light control film (LCF 1810) which is configured to block the zero-order diffracted light and to facilitate passage of a desired bandwidth of first-order diffracted light therethrough. In one embodiment light control film (LCF 1810) comprises a front layer (1802), a core layer (1804), and a back layer (1806). The back layer (1806) may be thought of as a datum, whereby a lateral shift in front film (1802) results in wavelength selectively, and a corresponding shift in core layer (1804) results in good zero-order light blocking. The resulting light is a pseudo-monochromatic source having sufficient coherence for use as a hologram reconstruction beam.

18 Claims, 18 Drawing Sheets

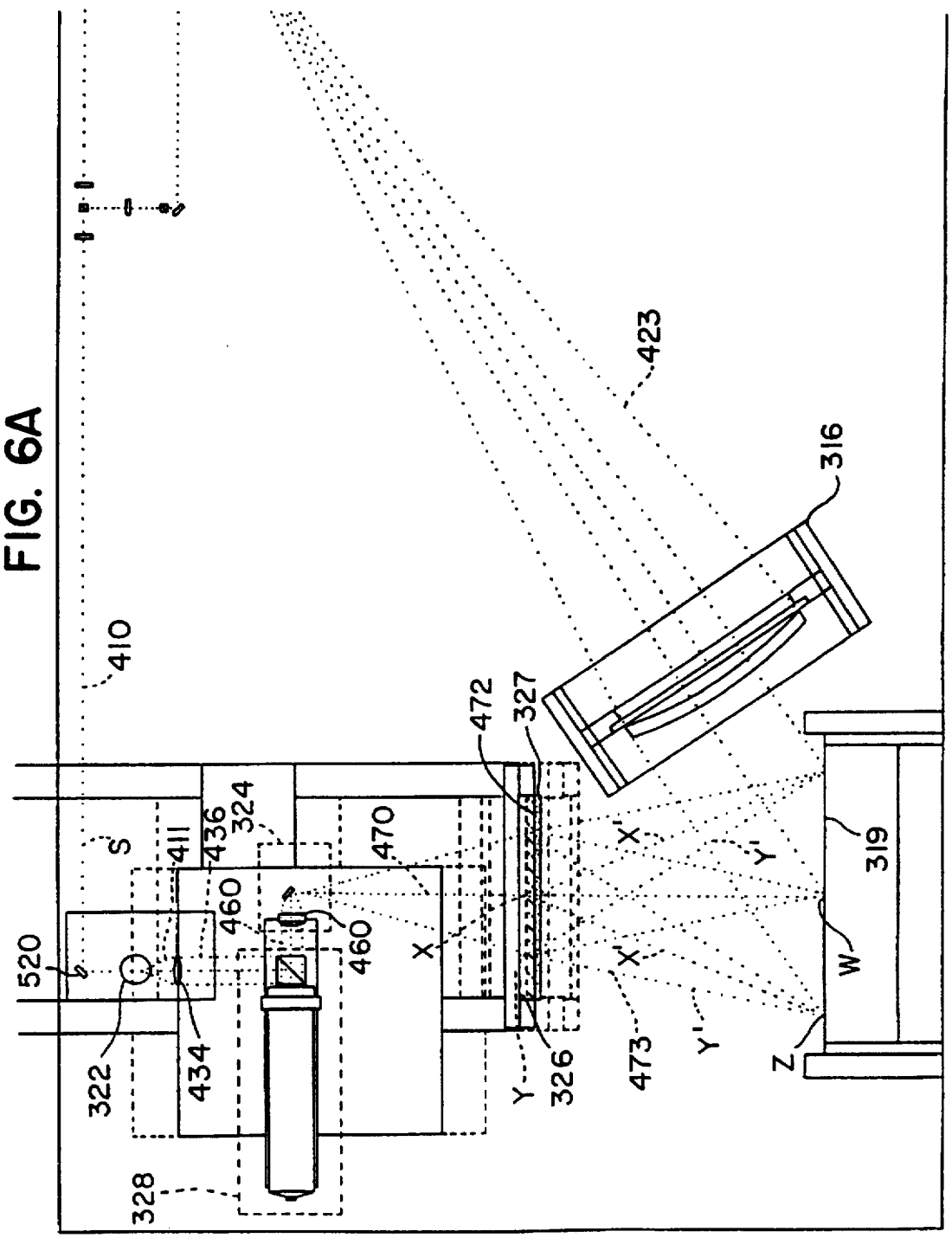

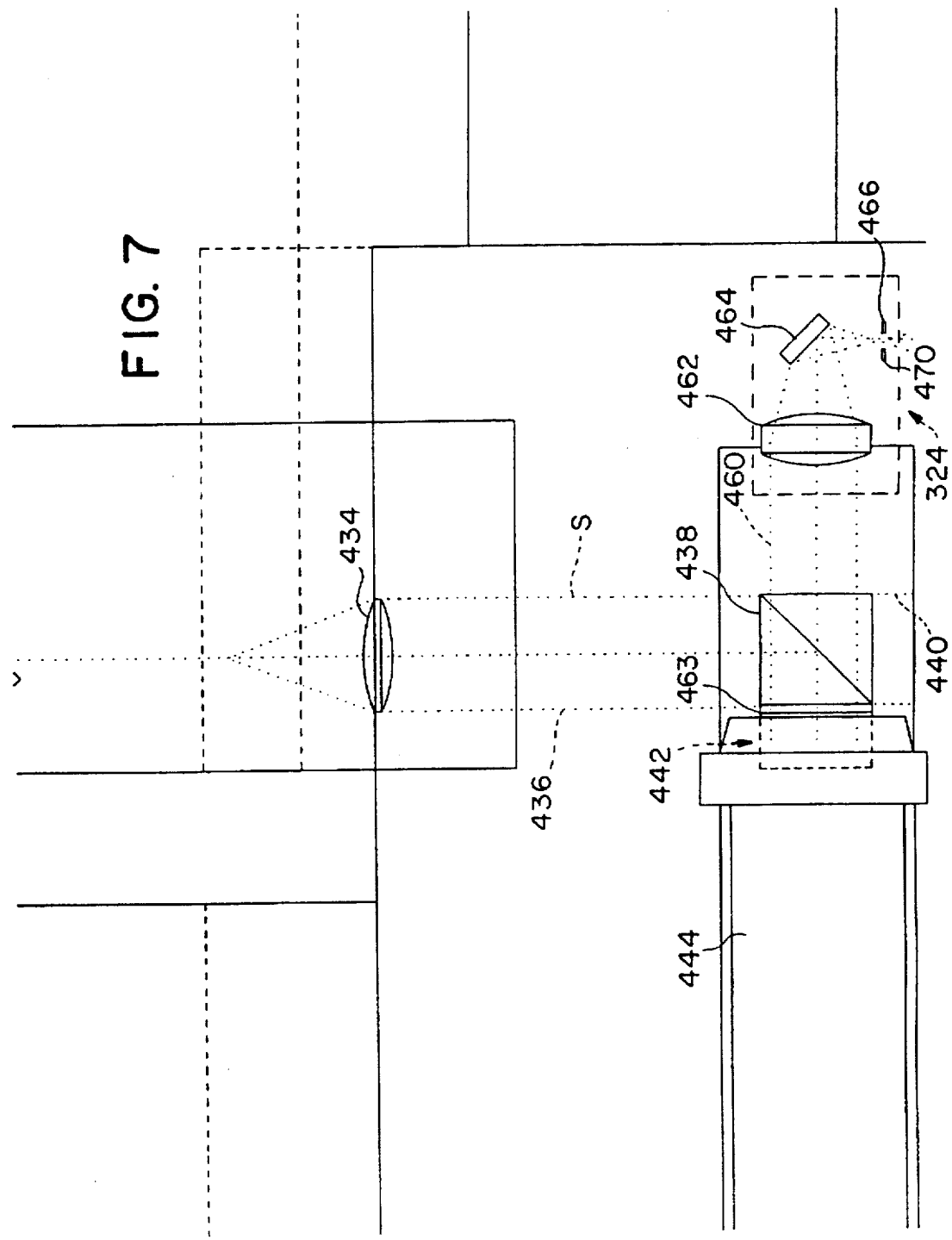

LIGHT CONTROL FILM FOR USE IN VIEWING HOLOGRAMS AND RELATED METHOD

CROSS-REFERENCE TO RELATED APPLICATIONS

This is a continuation-in-part (CIP) of U.S. patent application Ser. No. 07/982,316 of the same title filed Nov. 27, 1992 by inventor Stephen J. Hart, now abandoned; and of International Patent Application Ser. No. PCT/US93/11501 of the same title and inventor filed Nov. 26, 1993; and a continuation-in-part (CIP) of U.S. patent application Ser. No. 08/454,381 filed Sep. 11, 1995 by inventor Stephen J. Hart.

TECHNICAL FIELD

The present invention relates, generally, to methods and apparatus for making holograms, and more particularly to a technique for sequentially exposing a film substrate to a plurality of two-dimensional images representative of a three-dimensional physical system to thereby produce a hologram of the physical system.

BACKGROUND ART AND TECHNICAL PROBLEMS

A hologram is a three-dimensional record, for example a film record, of a physical system which, when replayed, produces a true three-dimensional image of the system. Holography differs from stereoscopic photography in that the holographic image exhibits full parallax by affording an observer a full range of viewpoints of the image from every angle, both horizontal and vertical, and full perspective; i.e., it affords the viewer a full range of perspectives of the image from every distance from near to far. A holographic representation of an image thus provides significant advantages over a stereoscopic representation of the same image. This is particularly true in medical diagnosis, where the examination and understanding of volumetric data is critical to proper medical treatment.

While the examination of data which fills a three-dimensional space occurs in all branches of art, science, and engineering, perhaps the most familiar examples involve medical imaging where, for example, Computerized Axial Tomography (CT or CAT), Magnetic Resonance (MR), and other scanning modalities are used to obtain a plurality of cross-sectional images of a human body part. Radiologists, physicians, and patients observe these two-dimensional data "slices" to discern what the two-dimensional data implies about the three-dimensional organs and tissue represented by the data. The integration of a large number of two-dimensional data slices places great strain on the human visual system, even for relatively simple volumetric images. As the organ or tissue under investigation becomes more complex, the ability to properly integrate large amounts of two-dimensional data to produce meaningful and understandable three-dimensional mental images may become overwhelming.

In prior art holograms employing a small number of superimposed holographic images on a single film substrate, the existence of a relatively small percentage of spurious exposed and/or developed photosensitive elements (fog) does not appreciably degrade the quality of the resulting hologram. In contrast, holograms made in accordance with the subject invention, discussed below, typically employ up to 100 or more holograms superimposed on a single film substrate; hence, the presence of a small amount of fog on each hologram would have a serious cumulative effect on the quality of the final product.

A method and apparatus for producing holograms is therefore needed which permits a large number, for example up to several hundred or more different holograms to be recorded on a single film substrate, thereby facilitating the true, three-dimensional holographic reproduction of human body parts and other physical systems which are currently viewed in the form of discrete data slices.

SUMMARY OF THE INVENTION

The present invention provides methods and apparatus for making holograms which overcome the limitations of the prior art.

In accordance with one aspect of the present invention, a hologram camera assembly comprises a single laser source and a beam splitter configured to split the laser beam into a reference beam and an object beam and to direct both beams at a film substrate. The assembly further comprises a spatial light modulator configured to sequentially project a plurality of two-dimensional images, for example a plurality of slices of data comprising a CT scan data set, into the object beam and onto the film. In this manner, a three-dimensional holographic record of each two-dimensional slice of the data set is produced on the film.

In accordance with another aspect of the invention, the entire data set, consisting of one to two hundred or more individual two-dimensional slices, is superimposed onto the film, resulting in the superposition of one hundred or more individual, interrelated holograms on the single substrate (the master hologram). In contrast to prior art techniques wherein a small number (e.g., one to four) of holograms are superimposed onto a single film substrate, the present invention contemplates methods and apparatus for recording a large number of relatively Weak holograms, each consuming an approximately equal, but in any event proportionate, share of the photosensitive elements within the film.

In accordance with a further aspect of the invention, a reference to-object copy (transfer) assembly is provided whereby the aforementioned master hologram may be quickly and efficiently reproduced in a single exposure as a single hologram.

In accordance with yet a further aspect of the invention, a hologram viewing device is provided for viewing the hologram produced in accordance with the invention. In particular, an exemplary viewing box in accordance with the present invention comprises a suitably enclosed, rectangular apparatus comprising a broad spectrum light source, e.g., a white light source mounted therein, a collimating (e.g., Fresnel) lens, a broad spectrum light source, e.g., diffraction grating, and a Venetian blind (louver). The collimating lens is configured to direct a collimated source of white light through the diffraction grating. In the context of the present invention, a collimated light refers to light in which all components thereof have the same direction of propagation such that the beam has a substantially constant cross-sectional area over a reasonable propagation length.

The diffraction grating is configured to pass light therethrough at an angle which is a function of the wavelength of each light component. The hologram also passes light therethrough at respective angles which are a function of the corresponding wavelengths. By inverting the hologram prior to viewing, all wavelengths of light emerge from the hologram substantially orthogonally thereto.

BRIEF DESCRIPTION OF THE DRAWING FIGURES

The subject invention will hereinafter be described in conjunction with the appended drawing figures, wherein like numerals denote like elements, and FIG. 1 shows a typical computerized axial tomography (CT) device;

FIG. 6A shows an enlarged schematic diagram of a portion of the camera system of FIG. 3;

FIG. 7 shows an enlarged schematic diagram of another portion of the camera system of FIG. 3;

Figure 10B:
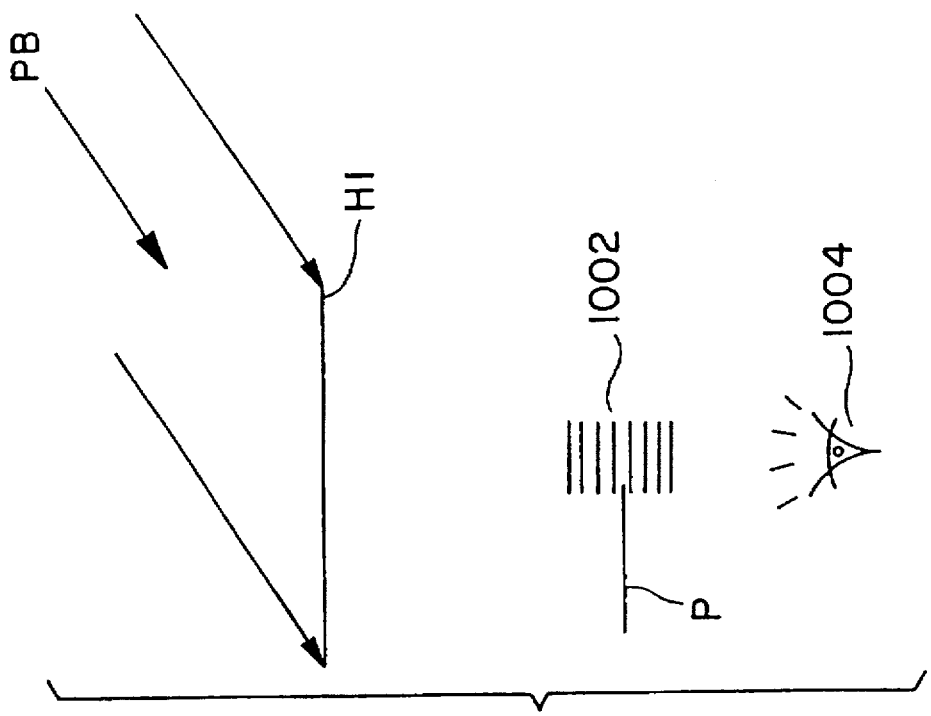
Figure 10A:
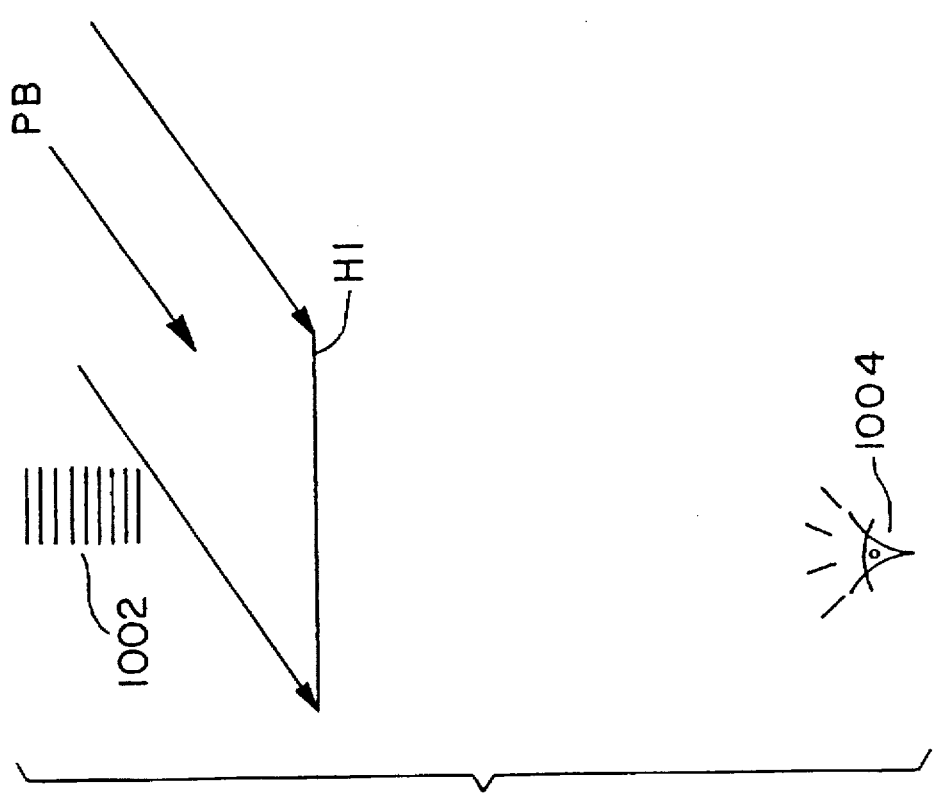
Figure 11:
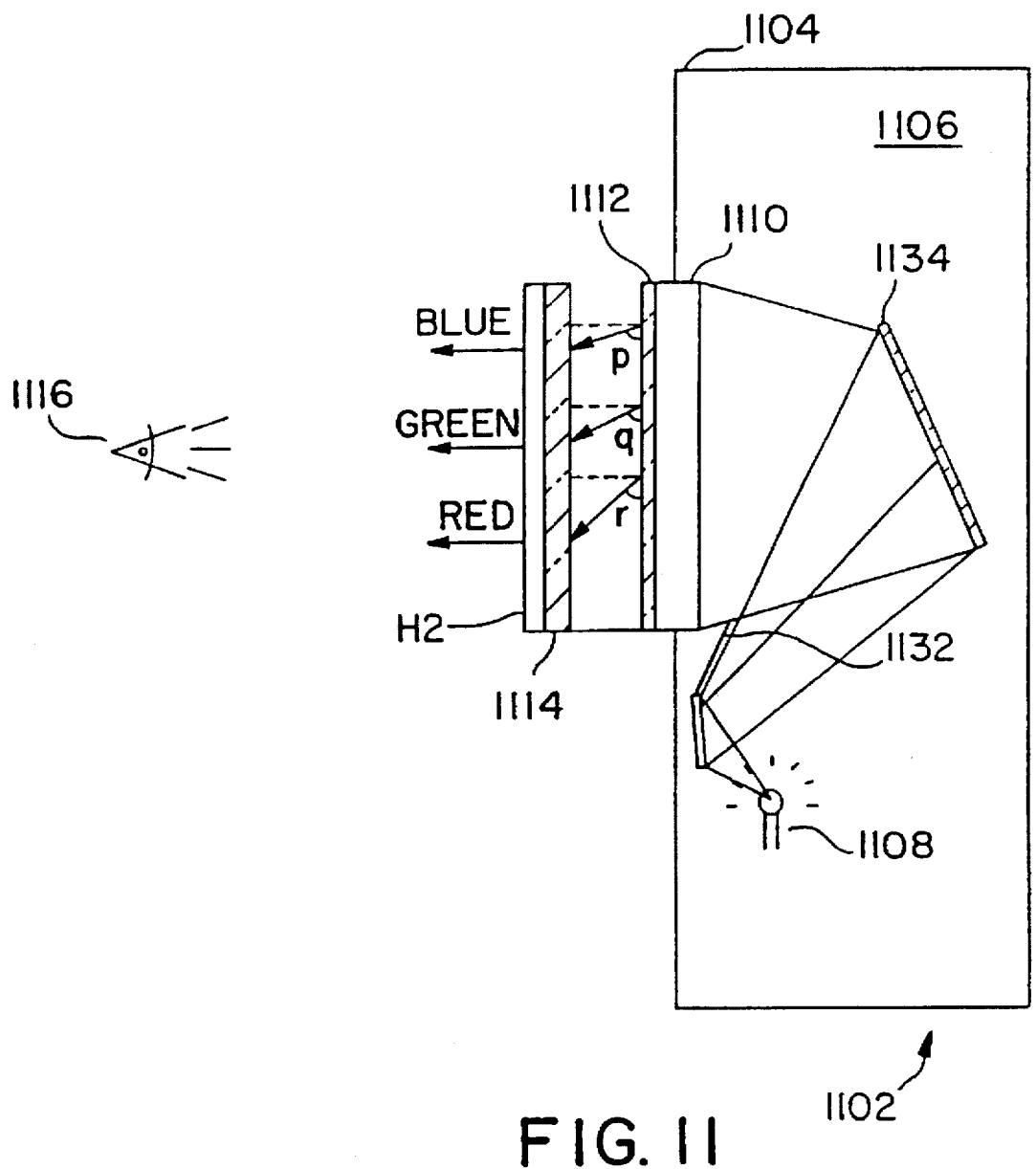
Figure 12:
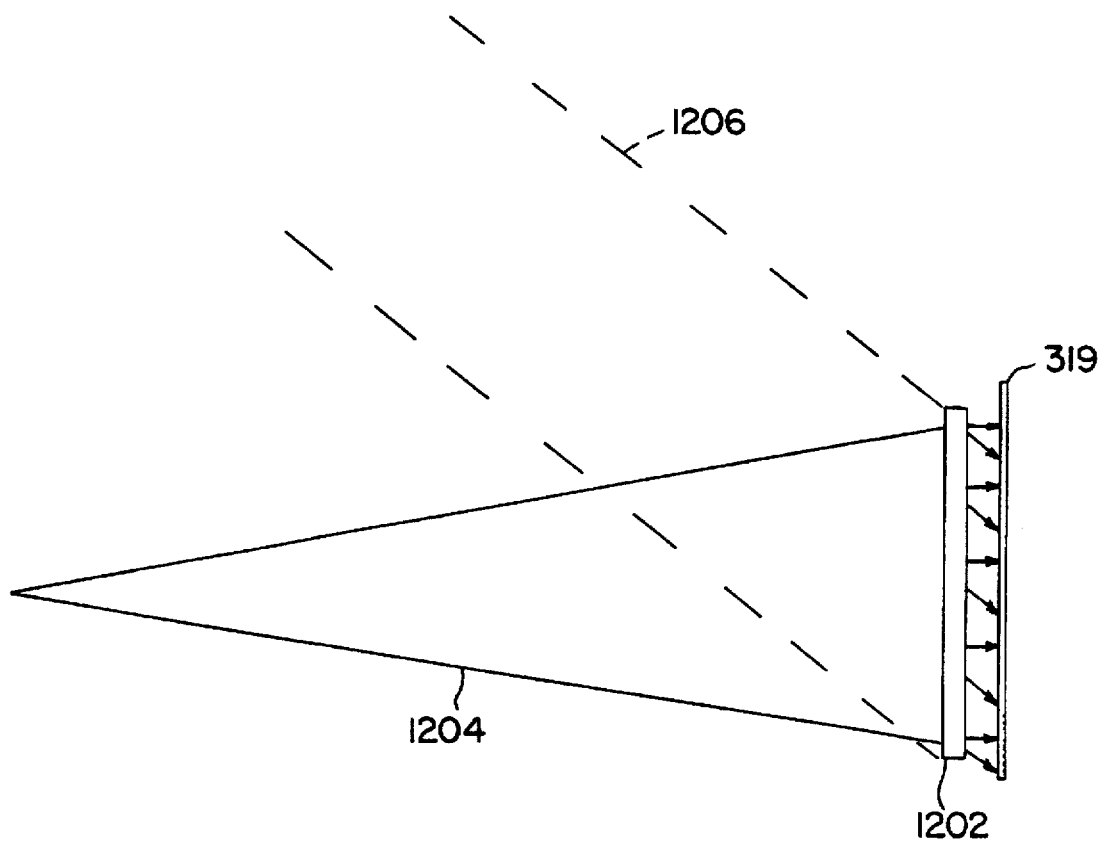
Figure 13:
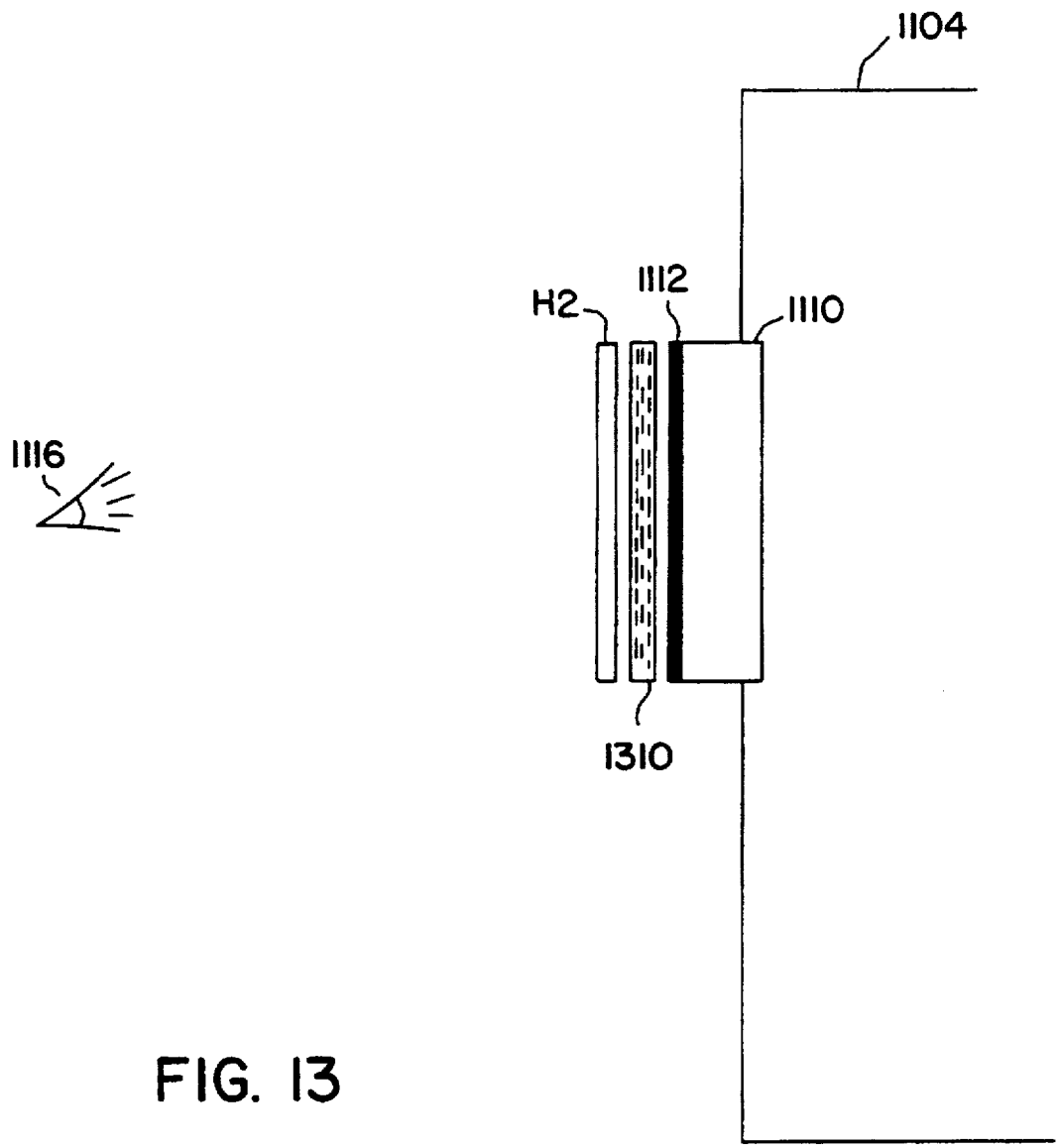
Figure 14:
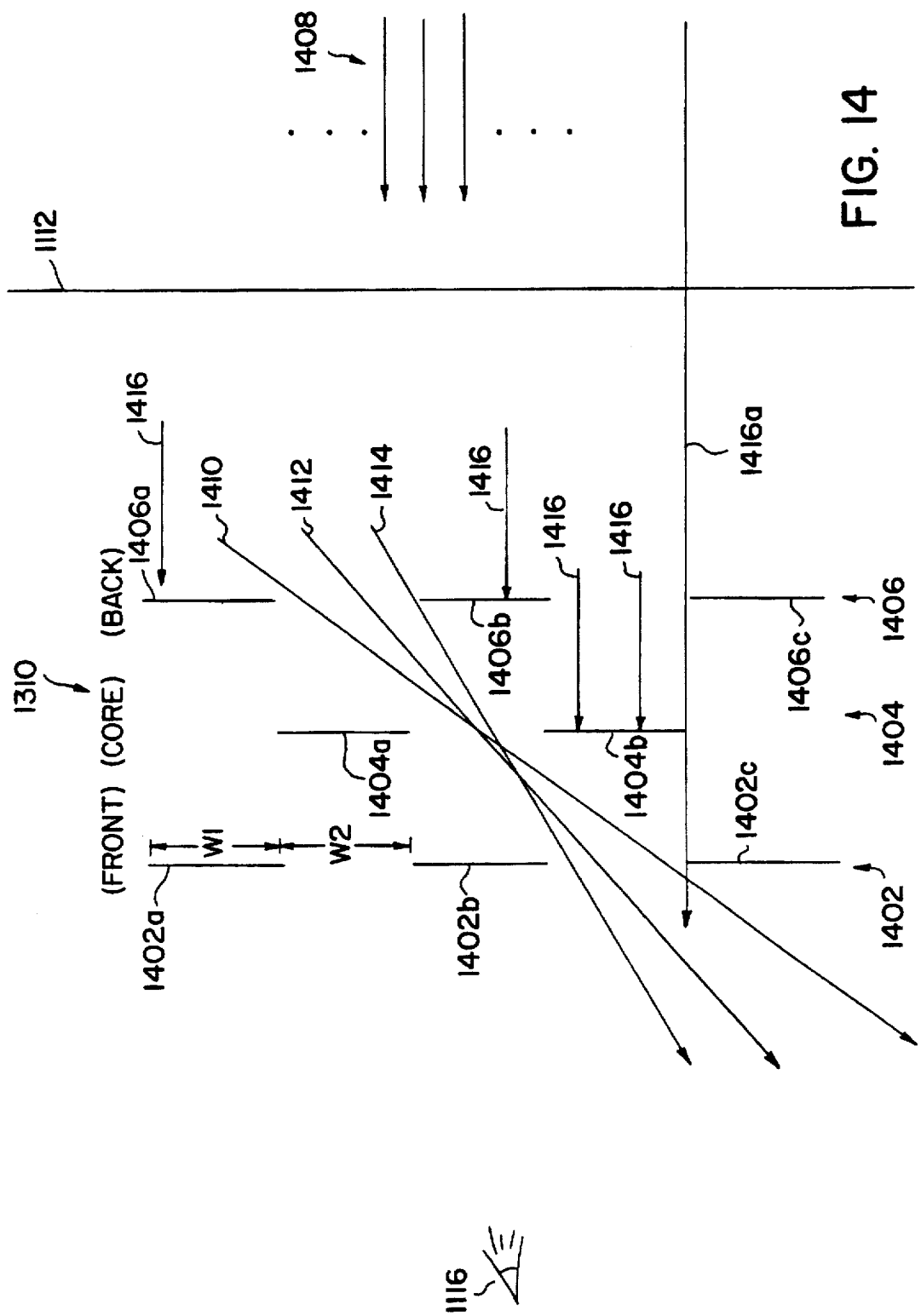
Figure 15:
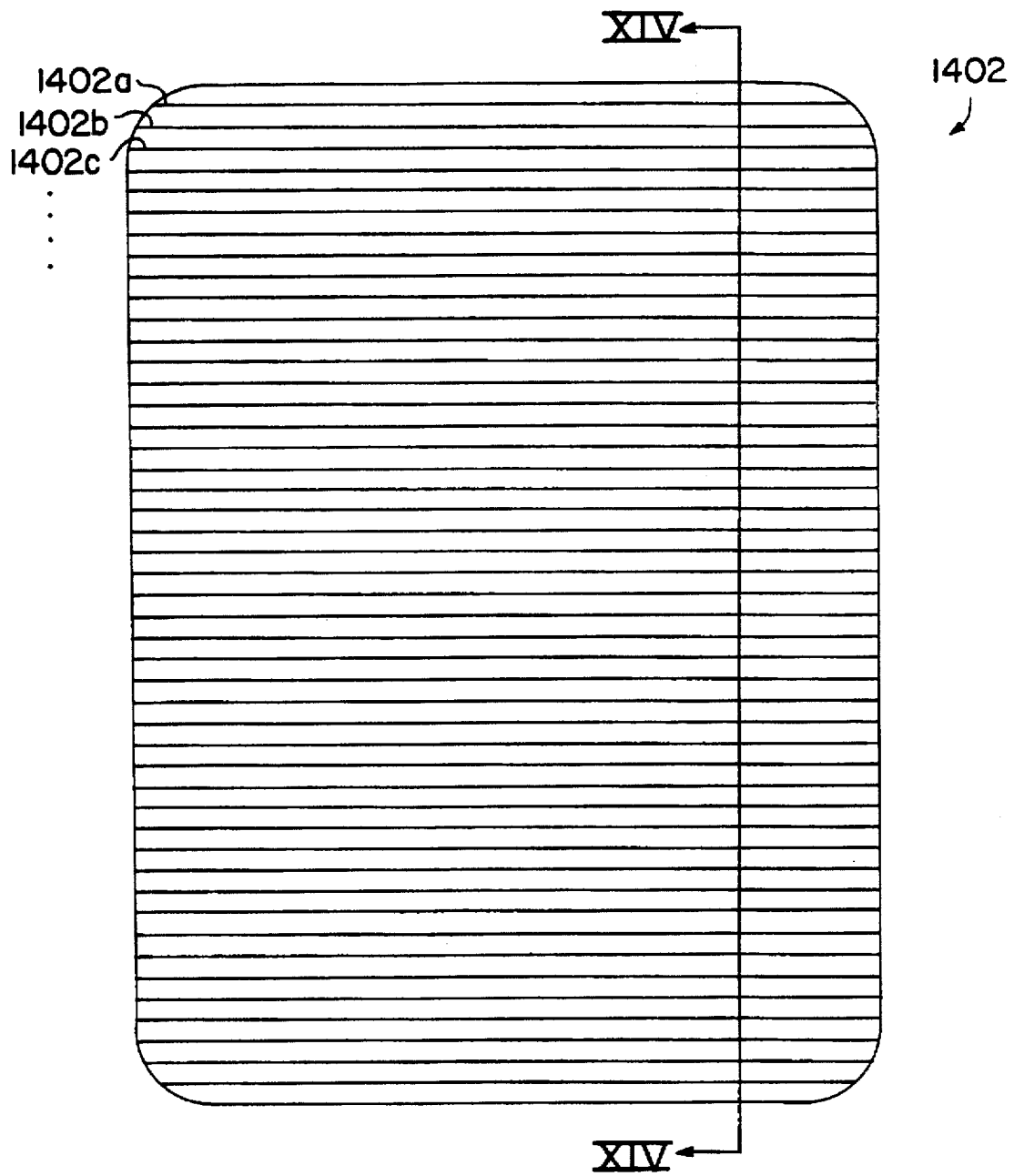
Figure 16:
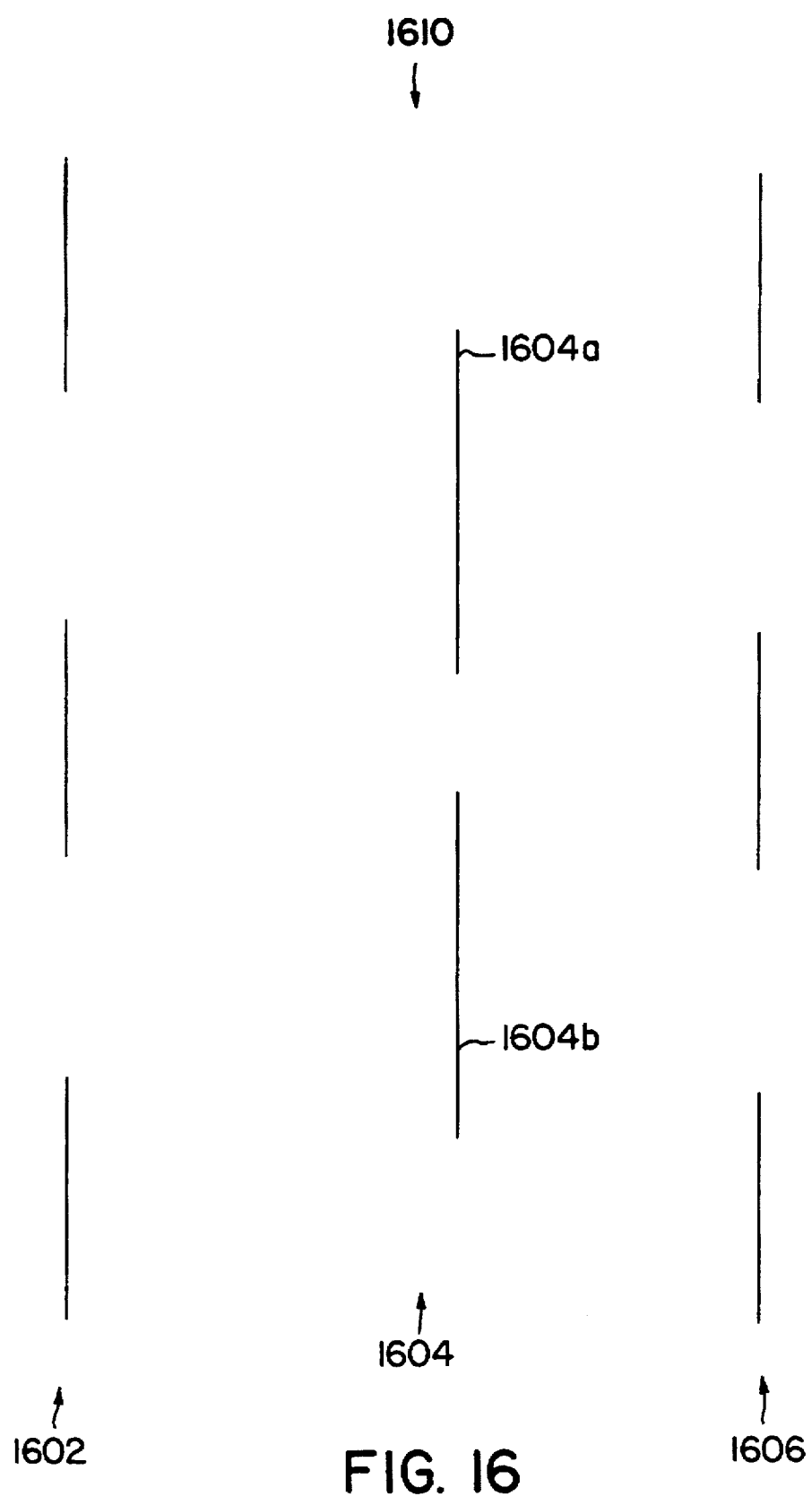
Figure 17:
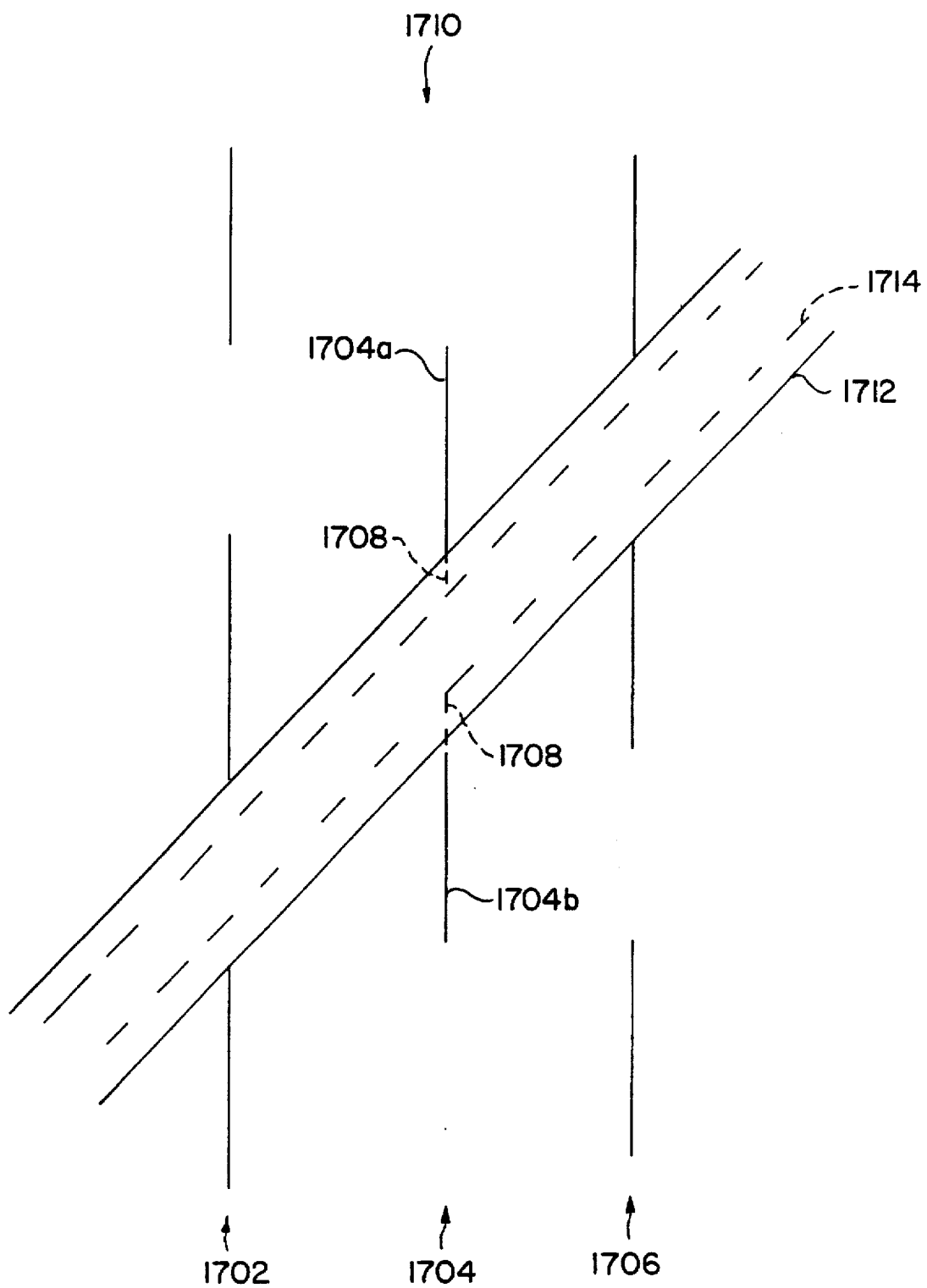
Figure 18:
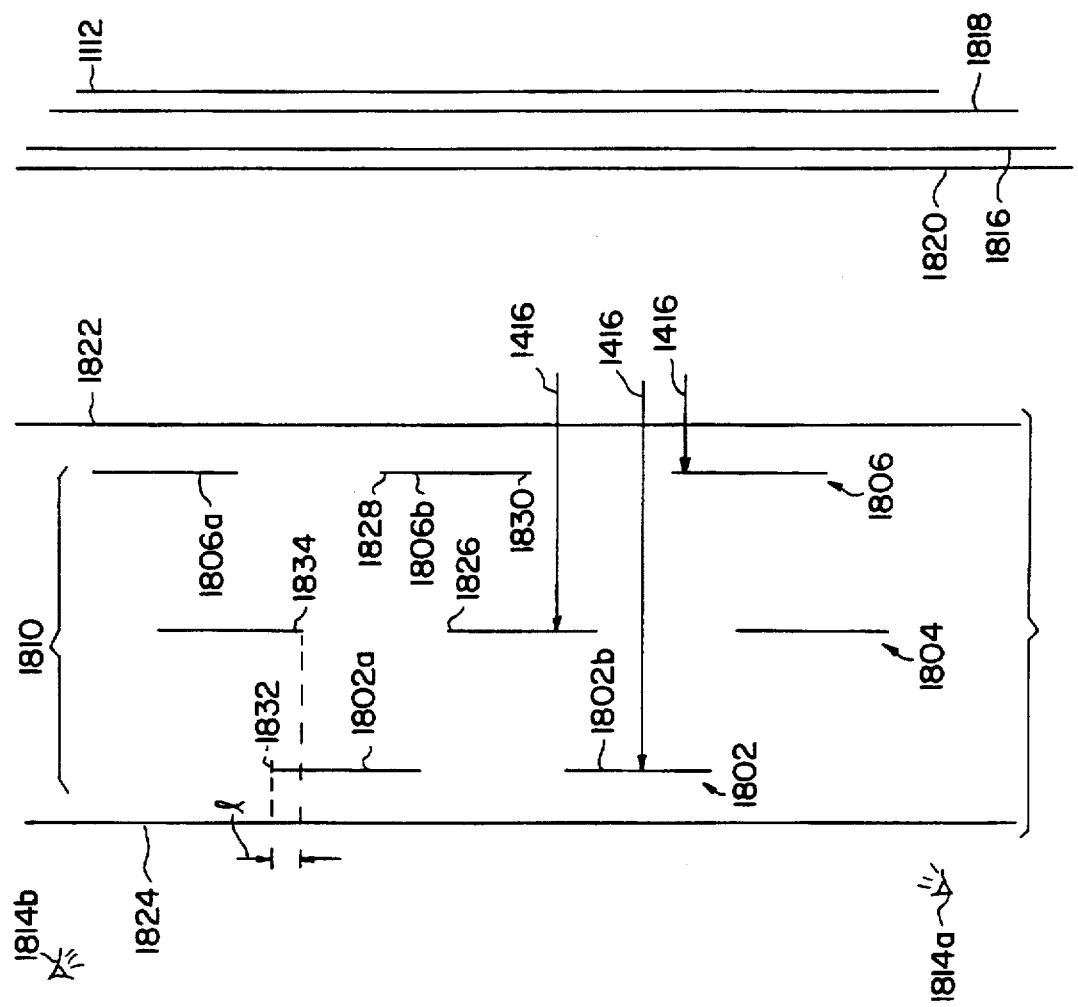

FIGS. 10A and 10B set forth orthoscopic and pseudoscopic views, respectively, of a master hologram being replayed in accordance with one aspect of the present invention;

FIG. 11 shows a schematic diagram of a hologram viewing apparatus;

FIG. 12 is a schematic diagram of an alternative embodiment of a "single step" camera system in accordance with the present invention;

FIG. 13 is a schematic diagram of an alternative embodiment of the viewing apparatus shown in FIG. 11 in accordance with the present invention;

FIG. 14 is a schematic cross-section view of a first alternative embodiment of a laminated, composite light control film (LCF) useful in the context of the viewing apparatus shown in FIG. 11;

FIG. 15 shows a front view of an exemplary one of the film sheets shown in FIG. 14;

FIGS. 16 and 17 are schematic cross-section views illustrating the effect of manipulating the film sheets of FIG. 14 on the passage of first order light through the LCF; and FIG. 18 is a schematic cross-section view of a second alternative embodiment of the LCF of FIG. 14.

DETAILED DESCRIPTION OF PREFERRED EXEMPLARY EMBODIMENTS

In the context of the present invention, a volumetric data set corresponding to a three-dimensional physical system (e.g., a human body part) is encoded onto a single recording material, e.g., a photographic substrate, to thereby produce a master hologram of the object. The master hologram may be used to produce one or more copies which, when replayed by directing an appropriate light source therethrough, recreates a three-dimensional image of the object exhibiting full parallax and full perspective. Thus, for a particular data set, the present invention contemplates a plurality of separate, interrelated optical systems: a camera system for producing a master hologram; a copy system for generating copies of the master hologram; and a viewing system for replaying either the master hologram or copies thereof, depending on the particular configuration of the camera system.

The Data Set

Presently known modalities for generating volumetric data corresponding to a physical system include, inter alia, computerized axial tomography (CAT or CT) scans, magnetic resonance scans (MR), three-dimensional ultra sound (US), positron emission tomography (PET), and the like. Although a preferred embodiment of the present invention is described herein in the context of medical imaging systems which are typically used to investigate internal body parts (e.g., the brain, spinal cord, and various other bones and organs), those skilled in the art will appreciate that the present invention may be used in conjunction with any suitable data set defining any three-dimensional distribution of data, regardless of whether the data set represents a physical system, e.g., numerical, graphical, and the like.

Figure 2:
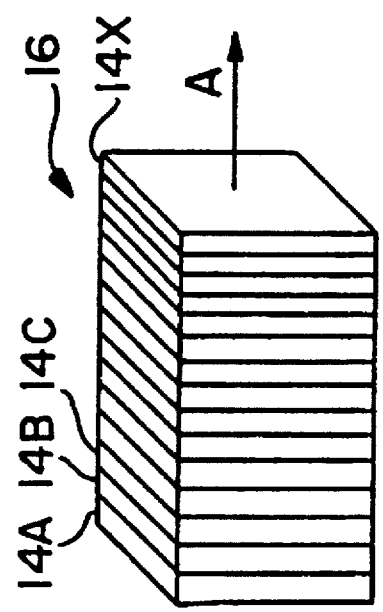
FIG. 2 shows a plurality of two-dimensional data slices each containing data such as may be obtained by x-ray devices typically employed in the CT device of FIG. 1, the slices cooperating to form a volumetric data set.
Figure 1:
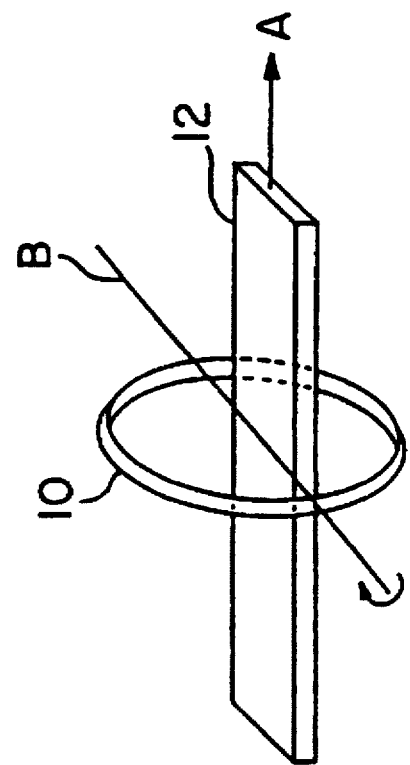

Referring now to FIGS. 1 and 2, a typical CT device comprises a gantry 10 and a table 12, as is known in the art. Table 12 is advantageously configured to move axially (along arrow A in FIG. 1) at predetermined increments. A patient (not shown) is placed on table 12 such that the body part to be interrogated is generally disposed within the perimeter of gantry 10.

Gantry 10 suitably comprises a plurality of x-ray sources and recording devices (both not shown) disposed about its circumference. As the patient is moved axially relative to gantry 10, the x-ray devices record a succession of two-dimensional data slices 14A, 14B, . . . 14X comprising the three-dimensional space (volume) 16 containing data obtained with respect to the interrogated body part (see FIG. 2). That is, the individual data slices 14 combine to form a volumetric data set 16 which, in total, comprises a three-dimensional image of the interrogated body part. As used herein, the terms "volume" or "volumetric space" refers to volumetric data set 16, including a plurality of two-dimensional data slices 14, each slice containing particular data regarding the body part interrogated by the given modality.

Typical data sets comprise on the order of 10 to 70 (for CT systems) or 12 to 128 (for MR) two-dimensional data slices 14. Those skilled in the art will appreciate that the thickness and spacing between data slices 14 are configurable and may be adjusted by the CT technician. Typical slice thicknesses range from 1.5 to 10 millimeters and most typically approximately 5 millimeters. The thickness of the slices is desirably selected so that only a small degree of overlap exists between each successive data slice.

Presently known CT scan systems generate data slices having a resolution defined by, for example, a 256 or a 512 square pixel matrix. Furthermore, each address within the matrix is typically defined by a twelve bit grey level value. CT scanners are conventionally calibrated in Houndsfield Units whereby air has a density of minus 1,000 and water a density of zero. Thus, each pixel within a data slice may have a grey level value between minus 1,000 and 3,095 (inclusive) in the context of a conventional CT system. Because the human eye is capable of simultaneously perceiving a maximum of approximately one hundred (100) grey levels between pure white and pure black, it is desirable to manipulate the data set such that each data point within a slice exhibits one (1) of approximately fifty (50) to one hundred (100) grey level values (as opposed to the 4,096 available grey level values). The process of redefining these grey level values is variously referred to as "windowing" (in radiology); "stretching" (in remote sensing/satellite imaging); and "photometric correction" (in astronomy).

The present inventor has determined that optimum contrast may be obtained by windowing each data slice in accordance with its content. For example, in a CT data slice which depicts a cross-section of a bone, the bone being the subject of examination, the relevant data will typically exhibit grey level values in the range of minus 600 to 1,400. Since the regions of the data slice exhibiting grey level values less than minus 600 or greater than 1,400 are not relevant to the examination, it may be desirable to clamp all grey level values above 1,400 to a high value corresponding to pure white, and those data points having grey level values lower than minus 600 to a low value corresponding to pure black.

As a further example, normal grey level values for brain matter are typically in the range of about 40 while grey level values corresponding to tumorous tissue may be in the 120 range. If these values were expressed within a range of 4,096 grey level values, it would be extremely difficult for the human eye to distinguish between normal brain and tumorous tissue. Therefore, it may be desirable to clamp all data points having grey level values greater than, e.g., 140, to a very high level corresponding to pure white, and to clamp those data points having grey scale values of less than, e.g., minus 30, to a very low value corresponding to pure black. Windowing the data set in this manner contributes to the production of sharp, unambiguous holograms.

In addition to windowing a data set on a slice-to-slice basis, it may also be advantageous, under certain circumstances, to perform differential windowing within a particular slice, i.e., from pixel to pixel. For example, a certain slice or series of slices may depict a deep tumor in a brain, which tumor is to be treated with radiation therapy, for example by irradiating the tumor with one or more radiation beams. In regions which are not to be irradiated, the slice may be windowed in a relatively dark manner. In regions which will have low to mid levels of radiation, a slice may be windowed somewhat more brightly. In regions of a high concentration of radiation, the slice may be windowed even brighter. Finally, in regions actually containing the tumor, the slice may be windowed the brightest. In the context of the present invention, the resulting hologram produces a ghostly image of the entire head, a brighter brain region, with the brightest regions being those regions which are either being irradiated (if the data set was taken during treatment) or which are to be irradiated.

A further preprocessing technique useful in the context of the present invention surrounds manipulating the aggregate brightness level for some or all of the slices within a particular data set to thereby reduce the differences in aggregate brightness level from slice to slice and to reduce the need for long exposure times for same or all of the slices. This technique is sometimes referred to herein as adding "asteroids" to certain data slices to enhance their brightness level.

More particularly and as discussed below in greater detail, each slice comprising the finished hologram desirably consumes its proportionate share of available photo-sensitive elements within the holographic substrate during processing of the hologram. In accordance with one aspect of the invention, this is achieved by coordinating various processing parameters for each data slice including, for example, the beam ratio, the aggregate brightness level for the particular data slice and the exposure time during which the particular data slice is projected on to the film substrate. As a general principle, brighter data slices require less exposure time, and relatively faint data slices require a higher exposure time. In order to reduce the exposure time for faint slices, the aggregate brightness level for a particular faint slice may be artificially boosted by adding a random or otherwise irregular pattern of bright spots to the data slice, preferably in the wings of the data slice remote from the image under examination. Alternatively, the portion of the object beam laser light may be diverted prior to passing through the data slice, for example through the use of an additional beam splitter, and controllably projected onto the film service. If desired, the diverted beam may be passed through as variable intensity polarizer, which polarizer comprises a random pattern of white spots, the intensity of which may be modulated to achieve a desired "astroid" beam intensity. In this regard, the asteroid may compromise a small pattern of bright spots, a large pattern of relatively diffused spots, or a combination of both. In accordance with a further aspect of the invention, the aforementioned polarizer may comprise a polaroid disk configured with asteroids, which disk may be rotated to modulate the asteroid intensity. Further, the asteroid disk may be equipped with a shutter to effectively shunt the asteroid beam for those slices which do not require an artificially elevated aggregate brightness level. This pattern of random white spots, or asteroids, artificially enhances the aggregate gray scale value of the slice, thereby reducing the exposure time for the slice. If desired, the asteroids may be subsequently masked from view in the final, finished composite hologram.

Another step in preparing the data set involves cropping, whereby regions of each data slice or even an entire data slice not germane to the examination are simply eliminated. Cropping of unnecessary data also contributes to the formation of sharp, unambiguous holograms.

More particularly, each point within the volume of the emulsion exhibits a microscopic fringe pattern corresponding to the entire holographic image from a unique viewpoint. Stated another way, an arbitrary point at the lower left hand corner of a holographic film comprises an interference fringe pattern which encodes the entire holographic image as the image is seen from that particular point. Another arbitrary point on the holographic film near the center of the film will comprise an interference fringe pattern representative of the entire holographic image when the image is viewed from the center of the film. These same phenomenon holds true for every point on the hologram. As briefly discussed above, a suitable photographic substrate preferably comprises a volume of photographic emulsion which adheres to the surface of a plastic substrate, for example triacetate. The emulsion typically comprises a very large number of silver halide crystals (grains) suspended in a gelatinous emulsion. Inasmuch as the emulsion contains a finite quantity of crystals, the elimination of unnecessary data (cropping) within a data slice ensures that substantially all of the silver halide grains which are converted (exposed) for each data slice correspond the relevant data from each slice. By conserving the number of silver halide grains which are converted for each data slice, a greater number of slices may be recorded onto a particular piece of film.

The Camera System

Once a data set is properly prepared (e.g., windowed and cropped), an individual hologram of each respective data slice is superimposed onto a single film substrate to generate a master hologram. In accordance with a preferred embodiment, each individual hologram corresponding to a particular data slice is produced while the data corresponding to a particular slice is disposed at a different distance from the film substrate, as discussed in greater detail below.

Figure 3:
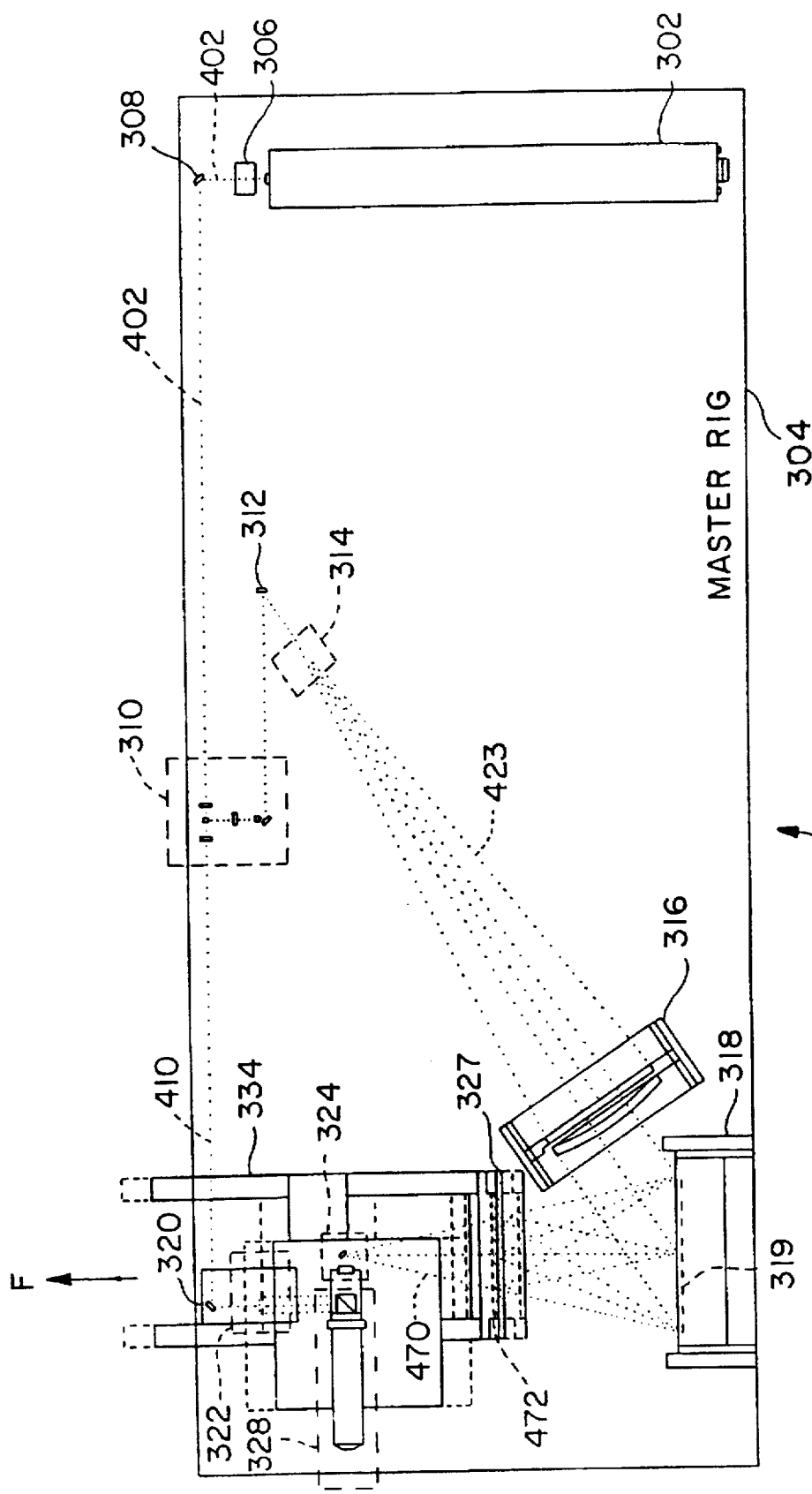
FIG. 3 shows a schematic diagram of a camera system in accordance with a preferred embodiment of the present invention.
Figure 4:
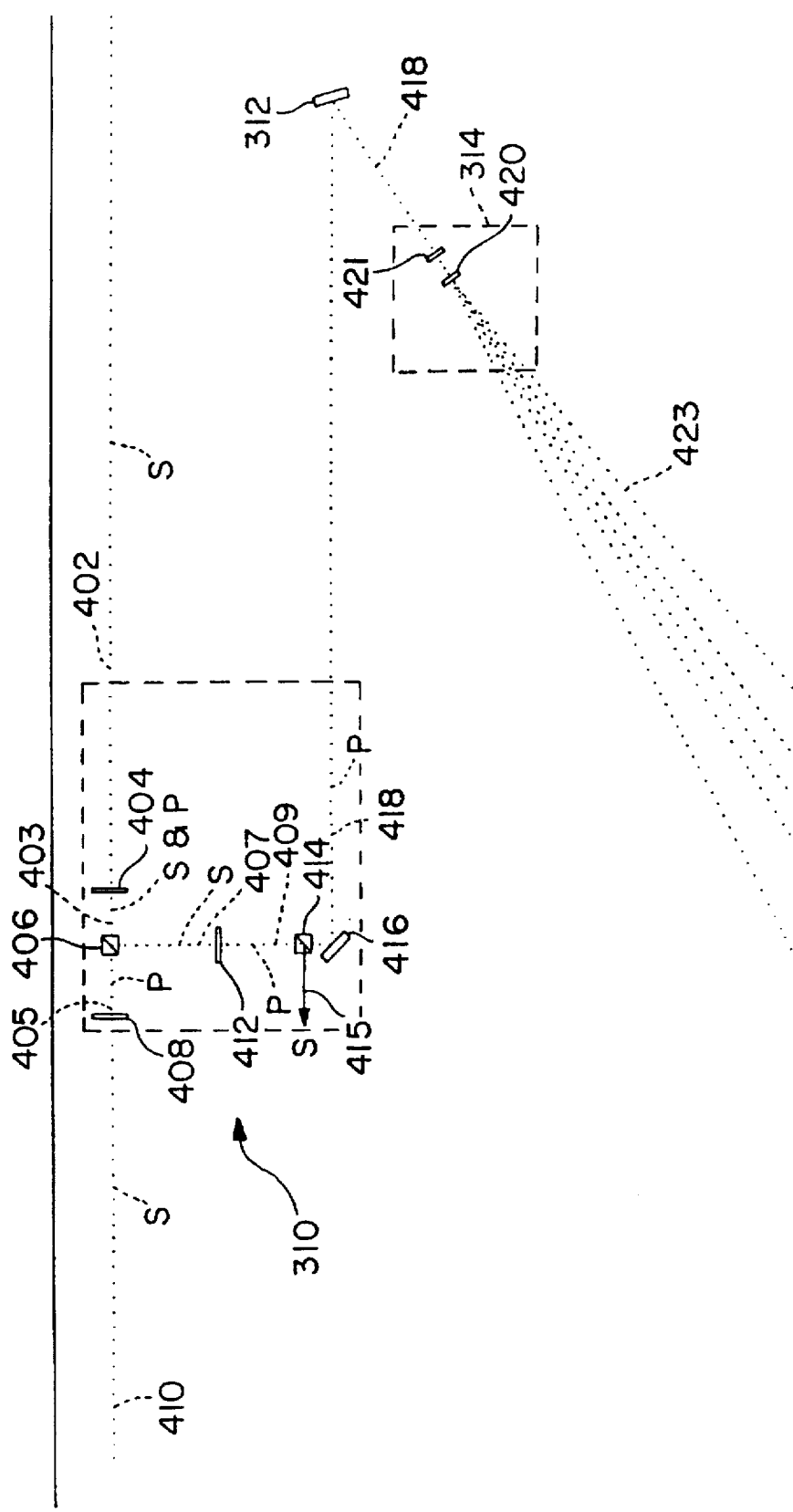
FIG. 4 shows a schematic diagram of a beam splitter assembly in accordance with a preferred embodiment of the present invention.

Referring now to FIGS. 3–4, a camera system 300 in accordance with the present invention suitably comprises a laser light source 302, a shutter 306, a first mirror 308, a beam splitting assembly 310, a second mirror 312, a reference beam expander 314, a collimating lens 316, a film holder 318, a third mirror 320, an object beam expander 322, an imaging assembly 328, a projection optics assembly 324, a rear projection screen comprising a diffusing surface 472 having a polarizer 327 mounted thereto, and a track assembly 334. Imaging assembly 328, projection optics assembly 324, and rear projection screen 326 are suitably rigidly mounted to track assembly 334 so that they move in unison as track assembly 334 is moved axially along the line indicated by arrow F. As discussed in greater detail below, track assembly 334 is advantageously configured to replicate the relative positions of data slices comprising the subject of the hologram. In a preferred embodiment, total travel of track assembly 334 is suitably sufficient to accommodate the actual travel of the particular scanning modality employed in generating the data set, for example on the order of 6 inches.

Camera assembly 300 is illustratively mounted on a rigid table 304 which is suitably insulated from environmental vibrations. Laser source 302 suitably comprises a conventional laser beam generator, for example an Argon ion laser including an etalon to reduce the bandwidth of the emitted light, preferably an Innova 306-SF manufactured by Coherent, Inc. of Palo Alto, Calif. Those skilled in the art will appreciate that laser 302 suitably generates a monochromatic beam having a wavelength in the range of 400 to 750 nanometers (nm), and preferably about 514.5 or 532 nm. Those skilled in the art will appreciate, however, that any suitable wavelength may be used for which the selected photographic material is compatible, including wavelengths in the ultraviolet and infrared ranges.

Alternatively, laser 302 may comprise a solid state, diode-pumped frequency-doubled YAG laser, which suitably emits laser light at a wavelength of 532 nm. These lasers are capable of emitting in the range of 300 to 600 million watts of pure light, are extremely efficient and air-cooled, and exhibit high stability.

Laser 302 should also exhibit a coherence length which is at least as great as the difference between the total path traveled by the reference and object beams, and preferably a coherence length of at least twice this difference. In the illustrated embodiment, the nominal design path length traveled by the reference beam is equal to that of the object brain (approximately 292 centimeters); however, due to, inter alia, the geometry of the setup, the particular reference angle employed, and the size of the film, some components of the reference and object beams may travel a slightly greater or lessor path length. Hence, laser 302 suitably exhibits a coherence length in excess of this difference, namely, approximately two (2) meters.

Shutter 306 suitably comprises a conventional electromechanical shutter, for example a Uniblitz 35 model no. LCS4Z manufactured by Vincent Associates of Rochester, N.Y. In a preferred embodiment, shutter 306 may be remotely actuated so that a reference beam and an object beam are produced only during exposure of the film substrate, effectively shunting the laser light from the system (e.g., via shutter 306) at all other times. Those skilled in the art will appreciate that the use of a shutter is unnecessary if a pulse laser source is employed. Moreover, it may be desirable to incorporate a plurality of shutters, for example a shutter to selectively control the reference beam and a different shutter to separately control the object beam, to permit independent control of each beam, for example to permit independent measurement and/or calibration of the respective intensities of the reference and object beams at the film surface.

The various mirrors (e.g., first mirror 308, second mirror 312, third mirror 320, etc.) employed in camera assembly 300 suitably comprise conventional front surface mirrors, for example a dielectric mirror coated on a pyrex substrate, for example stock mirror 10D20BD.1, manufactured by Newport. For a typical laser having a beam diameter on the order of 1.5 millimeters, mirror 308 suitably has a surface of approximately 1 inch in diameter.

First mirror 308 is suitably configured to direct a source beam 402 to beam splitting assembly 310. In the illustrated embodiment, first mirror 308 changes the direction of beam 402 by 90 degrees. Those skilled in the art, however, will appreciate that the relative disposition of the various optical components comprising camera assembly 300, and the particular path traveled by the various beams, are in large measure a function of the physical size of the available components. As a working premise, it is desirable that the reference beam and object beam emanate from the same laser source to ensure proper correlation between the reference and the object beam at the surface of film holder 318, and that the path traveled by the reference beam from beam splitter 310 to film 319 is approximately equal to the path traveled by the object beam from beam splitter 310 to film 319.

With momentary reference to FIG. 4, beam splitter assembly 310 preferably comprises a variable wave plate 404, respective fixed wave plates 408 and 412, respective beam splitting cubes 406 and 414, and a mirror 416. On a gross level, beam splitting assembly 310 functions to separate source beam 402 into an object beam 410 and a reference beam 418. Moreover, again with reference to FIG. 3, beam splitter assembly 310 also cooperates with imaging assembly 328 and polarizer 327 to ensure that the reference beam and the object beam are both purely polarized in the same polarization state, i.e., either substantially S or P polarized as discussed in greater detail below, when they contact an exemplary film substrate 319 mounted in film holder 318. By ensuring that the reference and object beams are pure polarized in the same polarization state, sharp, low noise interference fringe patterns may be formed.

With continued reference to FIG. 4, beam 402 generated by laser source 302 enters beam splitting assembly 310 in a relatively pure polarization state, for example as S polarized light. In the context of the present invention, S polarized light refers to light which is polarized with its electric field oscillating in a vertical plane; P polarized light refers to light having its electric field oriented in a horizontal plane. Beam 402 then passes through variable wave plate 404 whereupon the beam is converted into a beam 403, conveniently defined as comprising a mixture of S and P polarized light components. Beam 403 then enters beam splitting cube 406, which is suitably configured to split beam 403 into a first beam 405 comprising the P polarized light component of beam 403 and a second beam 407 comprising the S polarized light component of the beam 403. Beam splitting cube 406 suitably comprises a broad band beam splitter, for example a broad band polarization beam splitter, part no. 05FC16PB.3, manufactured by Newport. Although beam splitting cube 406 is ideally configured to pass all of (and only) the P polarized component of beam 403 and to divert all of (and only) the S polarized component of 403, it has been observed that such cubes are generally imperfect beam splitters, ignoring small losses due to reflection off of beam splitter surfaces. More precisely, such cubes typically exhibit an extinction ratio on the order of a thousand to one such that approximately 99.9 percent of the S polarized component of beam 403 is diverted into beam 407, and such that approximately 90 percent of the P polarized component of beam 403 passes through cube 406. Thus, beam 407 comprises 99.9 percent of the S polarized component of beam 403, and approximately 10 percent of the P polarized component of beam 403; similarly, beam 405 comprises approximately 90 percent of the P polarized component of beam 403 and approximately 0.1 percent of the S polarized component of beam 403.

Wave plates 404, 408, and 412 suitably comprise half wave plates for the laser wavelength in use, e.g., part no. 05RP02 manufactured by Newport. Wave plate 404 is configured to convert the S polarized beam 402 into a predetermined ratio of S and P polarized components. In a preferred embodiment, variable wave plate 404 comprises an LCD layer, which layer changes the polarization of the incoming beam in accordance with the voltage level at the LCD layer. A suitable wave plate 404 may comprise a Liquid Crystal Light Control System, 932-VIS available from Newport. Accordingly, wave plate 404 divides S polarized beam 402 into a mixture of S and P polarized light as a function of applied voltage. By manipulating the voltage on wave plate 404, the operator thereby controls the ratio of the intensity of the reference beam to the intensity of the object beam (the beam ratio). In a preferred embodiment, this ratio as measured at the plane of film 319 is approximately equal to unity.

In any event, beam 405 is almost completely pure P polarized, regardless of the voltage applied to wave plate 404; beam 407 is ideally pure S polarized, but may nonetheless contain a substantial P polarized component, depending on the voltage applied to wave plate 404.

With continued reference to FIG. 4, beam 405 then travels through wave plate 408 to convert the pure P polarized beam 405 to a pure S polarized object beam 410. Beam 407 is passed through wave plate 412 to convert the substantially S polarized beam to a substantially P polarized beam 409 which thereafter passes through splitting cube 414 to eliminate any extraneous S component. In particular, 99.9 percent of the residual S component of beam 409 is diverted from cube 414 as beam 415 and shunted from the system. In the context of the present invention, any beam which is shunted from, or otherwise removed from the system may be conveniently employed to monitor the intensity and quality of the beam.

The predominantly P component of beam 409 is passed through cube 414 and reflected by respective mirrors 416 and 312, resulting in a substantially pure P polarized reference beam 418. As discussed in greater detail below, by dividing source beam 402 into object beam 410 and reference beam 418 in the foregoing manner, both the object beam and reference beam exhibit extremely pure polarization, for example on the order of one part impurity in several thousand. Moreover, a high degree of polarization purity is obtained regardless of the beam ratio, which is conveniently and precisely controlled by controlling the voltage applied to variable wave plate 404.

With continued reference to FIGS. 3 and 4, beam 418 is reflected off mirror 312 and enters beam expander 314. Beam expander 314 preferably comprises a conventional positive lens 421 and a tiny aperture 420. The diameter of beam 418 at the time it enters beam expander 314 is suitably on the order of approximately 1.5 millimeters (essentially the same diameter as when it was discharged from laser 302). Positive lens 421 is configured to bring beam 418 to as small a focus as practicable. A suitable positive lens may comprise microscope objective M-20X manufactured by Newport. Aperture 420 suitably comprises a pin-hole aperture, for example a PH-15 aperture manufactured by Newport. For good quality lasers which emit pure light in the fundamental transverse electromagnetic mode (TEM$_{00}$), a good quality lens, such as lens 421, can typically focus beam 418 down to the order of approximately 10 to 15 microns in diameter. At the point of focus, the beam is then passed through aperture 420, which suitably comprises a small pin hole on the order of 15 microns in diameter. Focusing the beam in this manner effects a Fourier transform of the beam.

More particularly and with reference to FIGS. 5A–5D, the TEM$_{00}$ mode of propagation typically exhibited by a small diameter laser beam follows a Gaussian distribution transverse to the direction of propagation of the beam. With specific reference to FIG. 5A, this means that the intensity (I) of beam 418 exhibits a Gaussian distribution over a cross-section of the beam. For a Gaussian beam having a nominal diameter of one millimeter, a small amount of the beam at very low intensity extends beyond the one millimeter range.

Figure 5A:
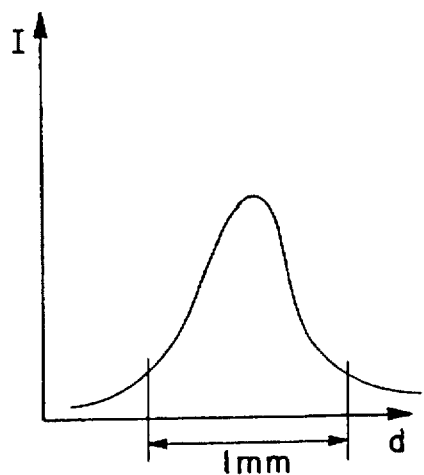
FIGS. 5A to 5D are graphic illustrations showing the effect of Fourier transforming the laser beam utilized in the camera system of FIG. 3.
Figure 5B:
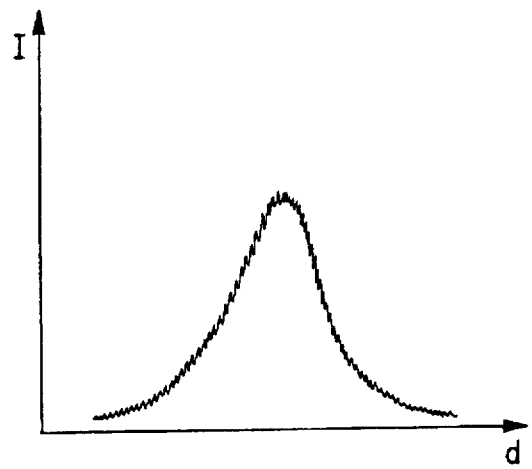

With reference to FIG. 5B, a more accurate representation of the ideal condition shown in FIG. 5A illustrates a substantially Gaussian distribution, but also including the random high frequency noise inevitably imparted to a beam as it is bounced off mirrors, polarized, etc. Note that FIG. 5B exhibits the same basic Gaussian profile of the theoretical Gaussian distribution of FIG. 5A, but further including random high frequency noise in the beam form ripples.

Figure 5C:
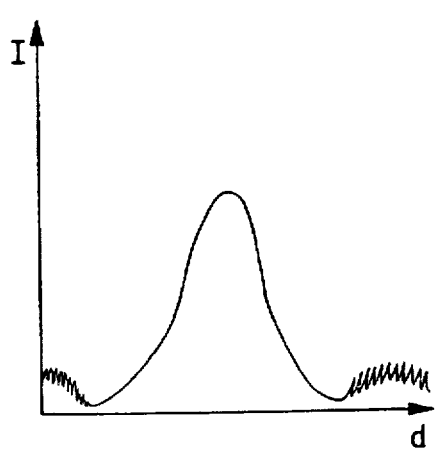
Figure 5D:
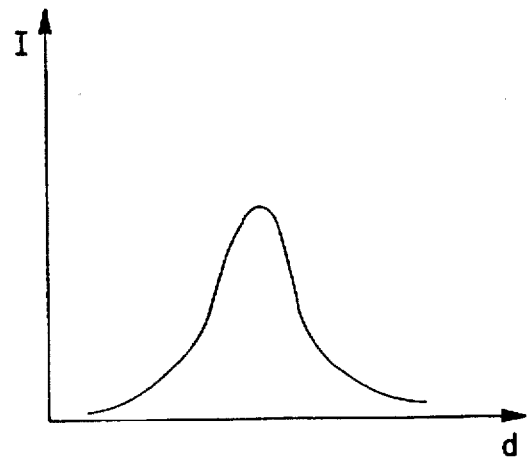

It is known that the Fourier transform of a Gaussian with noise produces the same basic Gaussian profile, but with the high frequency noise components shifted out onto the wings, as shown in FIG. 5C. When the Fourier transform of the beam is passed through an aperture, such as aperture 420 of beam expander 314, the high frequency wings are clipped, resulting in the extremely clean, noise free Gaussian distribution of FIG. 5D. Quite literally, focusing the beam to approximate a point source, and thereafter passing it through an aperture has the effect of shifting the high frequency noise to the outer bounds of the beam and clipping the noise.

Beam expander 314 thus produces a substantially noise free, Gaussian distributed divergent reference beam 423.

In a preferred embodiment of the present invention, lens 421 and aperture 420 suitably comprise a single, integral optical component, for example a Spatial Filter model 900 manufactured by Newport. Beam expander assembly 314 advantageously includes a screw thread, such that the distance between lens 421 and aperture 420 may be precisely controlled, for example on the order of about 5 millimeters, and two orthogonal set screws to control the horizontal and vertical positions of the aperture relative to the focus of lens 421.

With continued reference to FIG. 3, mirror 312 is suitably configured to direct beam 423 at film 319 at a predetermined angle which closely approximates Brewster's angle for the material comprising film 319. Those skilled in the art will appreciate that Brewster's angle is often defined as the arc tangent of the refractive index of the material upon which the beam is incident (here, film 319). Typical refractive indices for such films are in the range of approximately 1–5 plus or minus 0.1. Thus, in accordance with a preferred embodiment of the invention, mirror 312 is configured such that beam 423 strikes film 319 at a Brewster's angle of approximately 56 degrees (arc tan 1.5–56 degrees). Those skilled in the art will also appreciate that a P polarized beam incident upon a surface at Brewster's angle will exhibit minimum reflection from that surface, resulting in maximum refraction of reference beam 423 into film 319, thereby facilitating maximum interference with the object beam and minimum back reflected light which could otherwise eventually find its way into the film from an incorrect direction.

Referring now to FIGS. 4 and 6–7, object beam 410 is reflected by mirror 320 and directed into beam expander 322 which is similar in structure and function to beam expander 314 described above in conjunction with FIG. 4. A substantially noise free, Gaussian distributed divergent object beam 411 emerges from beam expander 322 and is collimated by a collimating lens 434, resulting in a collimated object beam 436 having a diameter in the range of approximately 5 centimeters. Collimating lens 434 suitably comprises a bi-convex optical glass lens KBX148 manufactured by Newport. Collimated object beam 436 is applied to imaging assembly 328.

Figure 8:
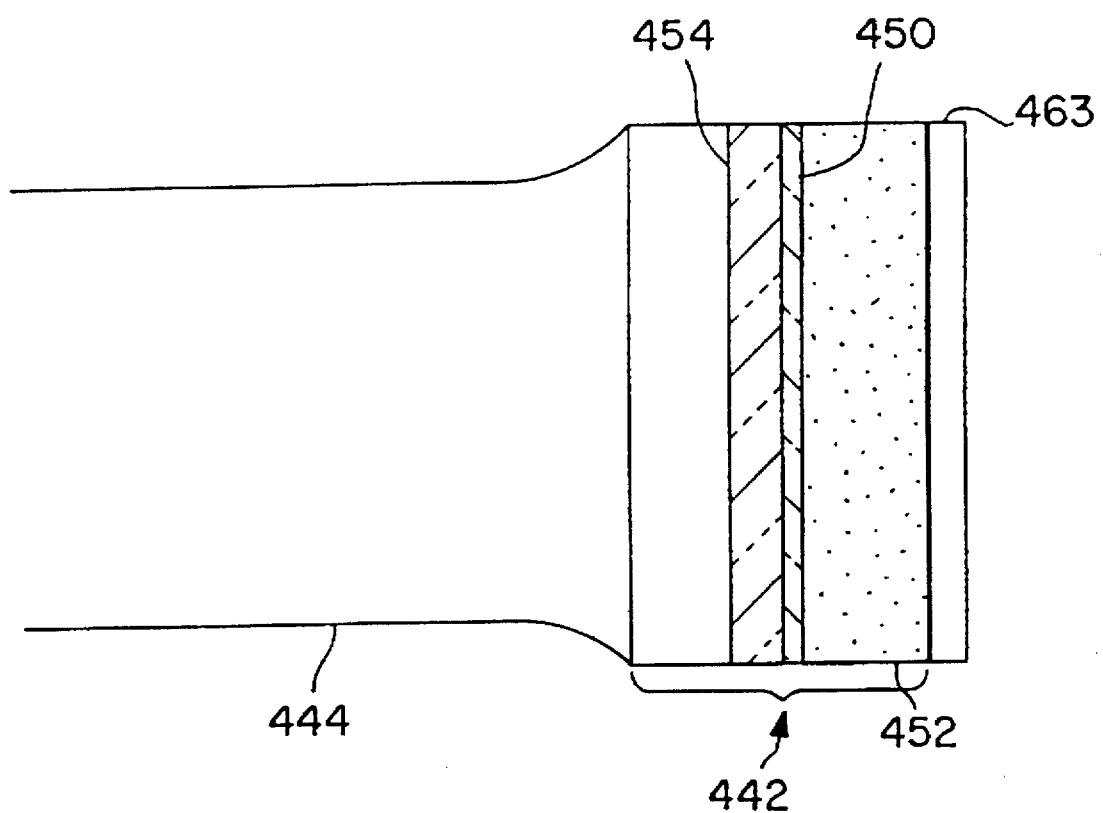
FIG. 8 shows an enlarged schematic diagram of a portion of the projection assembly utilized in the camera assembly of FIG. 3.

With reference to FIGS. 7 and 8, imaging assembly 328 suitably comprises a cathode ray tube (CRT) 444, a light valve 442, a wave plate 463, and a polarizing beam splitting cube 438. In a preferred embodiment, beam splitting cube 438 is approximately a 5 centimeter square (2 inch square) cube. As discussed in greater detail below, a beam 460, comprising a P polarized beam which incorporates the data from a data slice through the action of imaging assembly 328, emerges from imaging assembly 328 and is applied to projection optics assembly 324.

As discussed above, a data set comprising a plurality of two-dimensional images corresponding to the three-dimensional subject of the hologram is prepared for use in producing the master hologram. The data set may also be maintained in an electronic data file in a conventional multi-purpose computer (not shown). The computer interfaces with CRT 444 such that the data slices are transmitted, one after the other, within imaging assembly 328.

More particularly, a first data slice is projected by CRT 444 onto light valve 442. As explained in greater detail below, the image corresponding to the data slice is applied to film 319. The reference and object beams are applied to film 319 for a predetermined amount of time sufficient to permit film 319 to capture (record) a fringe pattern associated with that data slice and thereby create a hologram of the data slice within the emulsion comprising film 319. Thereafter, track assembly 334 is moved axially and a subsequent data slice is projected onto film 319 in accordance with the distances between data slices; a subsequent hologram corresponding to the subsequent data slice is thus superimposed onto film 319. This process is sequentially repeated for each data slice until the number of holograms superimposed onto film 319 corresponds to the number of data slices 14 comprising the particular volumetric data set 16 which is the subject matter of the master hologram being produced.

More particularly and with continued reference to FIGS. 7 and 8, CRT 444 suitably comprises a conventional fiber-optic face-plate CRT, for example, 41397T1 manufactured by the Hughes Aircraft Company of Carlsbad, Calif. CRT 444 is configured to project an image corresponding to a particular data slice onto the left hand side of light valve 442 (FIG. 7).

In a preferred embodiment, light valve 442 is a Liquid Crystal Light Valve H4160 manufactured by Hughes Aircraft Company of Carlsbad, Calif. With specific reference to FIG. 8, light valve 442 preferably comprises a photocathode 454, a mirror 450, having its mirrored surface facing to the right in FIG. 8, and a liquid crystal layer 452. Liquid crystal layer 452 comprises a thin, planar volume of liquid crystal which alters the polarization of the light passing therethrough as a function of the localized voltage level of the liquid crystal.

Photocathode 454 comprises a thin, planar volume of a photovoltaic material which exhibits localized voltage levels as a function of light incident thereon. As the image corresponding to a particular data slice 14 is applied by CRT 444 onto photocathode 454, local photovoltaic potentials are formed on the surface of photocathode 454 in direct correspondence to the light distribution within the cross-section of the applied image beam. In particular, the beam generated by CRT 444 corresponding to the data slice typically comprises light regions corresponding to bone, soft tissue, and the like, on a dark background. The dark background areas predictably exhibit relatively low grey scale values, whereas the lighter regions of the data slice exhibit correspondingly higher grey scale values. A charge distribution corresponding to the projected image is produced on the surface of photocathode 454.

The static, non-uniform charge distribution on photocathode 454, corresponding to local brightness variations in the data embodied in a particular data slice 14, passes through mirror 450 and produces corresponding localized voltage levels across the surface of liquid crystal layer 452. These localized voltage levels within liquid crystal layer 452 rotate the local liquid crystal in proportion to the local voltage level, thereby altering the pure S polarized light diverted from cube 438 onto mirrored surface 450, into localized regions of polarized light having a P component associated therewith, as the light passes through crystal layer 452 and is reflected by mirror 450. The emerging beam 460 exhibits (in cross-section) a distribution of P polarized light in accordance with the voltage distribution within crystal layer 452 and, hence, in accordance with the image corresponding to the then current data slice 14.

Substantially all (e.g., 99.9%) of the S polarized light comprising beam 436 is diverted by cube 438 onto liquid crystal layer 452. This S polarized light is converted to P polarized light by liquid crystal layer 452 in accordance with the voltage distribution on its surface, as described above. The P polarized light is reflected by the mirrored surface of mirror 450 back into cube 438; the P polarized light passes readily through cube 438 into projection optics assembly 324.

The S component of the beam reflected off of the mirrored surface of mirror 450 will be diverted 90 degrees by beam splitting cube 438. To prevent this stray S polarized light from re-entering the system, cube 438 may be tilted slightly so that this S polarized light is effectively shunted from the system.

The resultant beam 460 exhibits a distribution of P polarized light across its cross-section which directly corresponds to the data embodied in the data slice currently projected by CRT 444 onto light valve 442. As a result of the high extinction ratio of cube 438, beam 460 comprises essentially zero S polarization. Note also that the small portion of S polarized light comprising beam 436 which is not reflected by cube 438 into light valve 442 (namely, a beam 440) may be conveniently shunted from the system.

Beam splitting cube 438 is similar in structure and function to beam splitting cubes 406 and 414, described herein in connection with FIG. 4, and preferably comprises a large broad band polarization beam splitter, for example a PBS-514.5-200 manufactured by CVI Laser Corporate of Albuquerque, N.M. In a preferred embodiment, beam splitting cube 438 has a cross-section at least as large as the image projected by CRT 444 onto light valve 442, e.g., 2 inches. This is in contrast to beam splitting cubes 406 and 414 which can advantageously be of smaller cross-section, e.g., one-half inch, comparable to the diameter of the unexpanded beam 402 from laser 302.

In the context of the present invention, light which is variously described as removed, eliminated, or shunted from the system may be disposed of in any number of convenient ways. For example, the light may be directed into a black box or onto a black, preferably textured surface. The precise manner in which the light is shunted, or the particular location to which the light is shunted is largely a matter of convenience; what is important is that light which is to be removed from the system be prevented from striking the film surface of a hologram (for reasons discussed herein), and further that the light be prevented from reentering the laser source which could disturb or even damage the laser.

Although projection optics 328 illustratively comprises light valve 442, any suitable mechanism which effectively integrates the image corresponding to a data slice into the object beam will work equally well in the context of the present invention. Indeed, light beam 460, after emerging from cube 438, merely comprises a nonuniform distribution of P polarized light which varies in intensity according to the distribution of data on the then current data slice 14. The cross-section of beam 460 is substantially identical to a hypothetical beam of P polarized light passed through a photographic slide of the instant data slice.

Moreover, any suitable mechanism may be employed in addition to or in lieu of CRT 444 to project data onto light valve 442. For example, a reflective, transmissive or transflective LCD may be employed, which panel may be selectively energized on a pixel-by-pixel basis to thereby replicate the data corresponding to each particular data slice.

Alternatively, an appropriate beam, for example a laser beam, may be suitably rasterscanned across the rear surface of light valve 442 to thereby replicate the data corresponding to each data slice.

In yet a further embodiment, although CRT 444 is shown in FIG. 7 as abutting light valve 442, it may be desirable to configure the projection assembly such that CRT 444 is separated from light valve 442. Such a separation may be desirable, for example, if the diameter of CRT 444 is larger than the diameter of light valve 442 such that the image projected by CRT 444 is desirably projected onto the rear surface of light valve 442, for example, through the use of an appropriate lens disposed therebetween. Moreover, it may also be desirable to employ a fiber optic coupling between light valve 442 and CRT 444, regardless of whether an intervening lens is employed, and further regardless of the magnitude of the separation therebetween.

Moreover, projection optics 328 may be wholly replaced by a suitable spatial light modulator (SLM; not shown) conveniently mounted in the object beam path. In this way, the laser light comprising the object beam would pass through the SLM, with the SLM imparting to the object beam information corresponding to a particular image. Depending on the type of SLM used, such an arrangement may be employed either with or without the use of a diffuser between the SLM and film holder 319, as appropriate.

With continued reference to FIGS. 7 and 8, wave plate 463 is suitably interposed between light valve 442 and beam splitting cube 438. Wave plate 463 functions to correct certain undesirable polarization which light valve 442 inherently produces.

More particularly, light valve 442 polarizes the light which passes through liquid crystal layer 452 in accordance with the local voltage distribution therewithin. Specifically, the applied voltage causes the liquid crystals to rotate, e.g., in an elliptical manner, the amount of rotation being proportional to the localized voltage level. That is, a very high voltage produces a large amount of liquid crystal rotation, resulting in a high degree of altercation of the polarization of the light passing through the rotated crystals. On the other hand, a very low voltage produces a correspondingly small degree of liquid crystal rotation, resulting in a correspondingly small amount of altercation in the level of polarization. However, it has been observed that a very small degree of liquid crystal rotation (pre-tilt) exists even in the absence of an applied voltage. Thus, approximately one percent of the S polarized light passing through liquid crystal layer 452 is convened to P polarized light, even within local regions of liquid crystal layer 452 where no voltage is applied. While this very small degree of spurious polarization does not generally degrade the performance of light valve 442 in most contexts, it can be problematic in the context of the present invention. For example, if one percent of pure S polarized light is inadvertently converted to P polarized light, the contrast ratio of the resulting hologram may be substantially limited.

Wave plate 463 is configured to compensate for the foregoing residual polarization by, for example, imparting a predetermined polarization to the light passing therethrough, which is calculated to exactly cancel that amount of polarization induced by liquid crystal layer 452 in the absence of an applied voltage. By eliminating this undesired polarization, the effective contrast ratio of the resulting hologram is limited only by the degree of control achieved in the various process parameters, as well as the inherent capabilities of the equipment comprising camera assembly 300. of the SLM output beam will be subsequently disrupted and repolarized in any event.

Figure 6B:
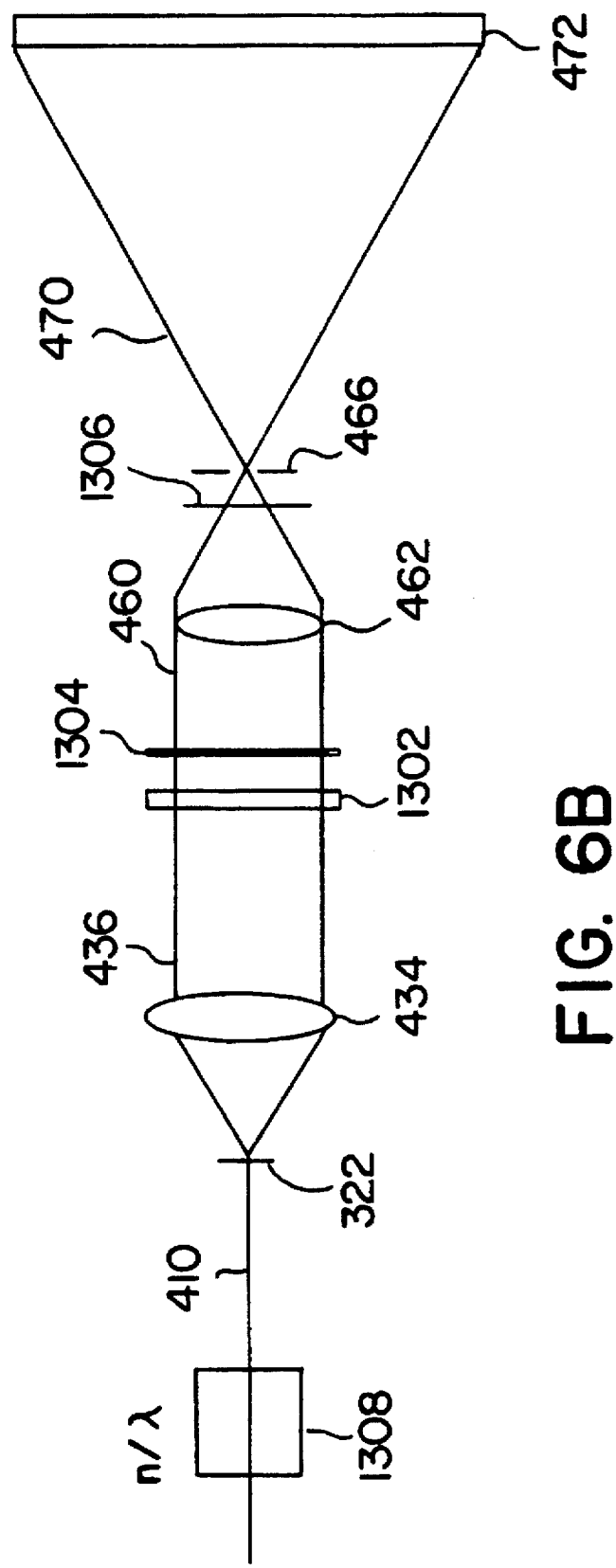
FIG. 6B shows a schematic diagram of an alternative embodiment of the spatial light modulator shown in FIG. 3.

Referring now to FIG. 6B, an alternative embodiment of the camera assembly shown in FIG. 6A will now be described. In particular, incoming beam 410 is passed through beam expander 322 and collimating lens 434. Collimated beam 436 is then passed through a liquid crystal display (LCD) SLM 1302, whereupon the image corresponding to a data slice is interposed into the collimated beam.

In accordance with the alternate embodiment set forth in FIG. 6B, LCD 1302 suitably comprises a transmissive, pixelated LCD, for example, a 640 by 480 pixel screen. Inasmuch as transmissive LCD 1302 will typically impart a "pretilt" to the light passed through it, it may also be desirable to pass incoming beam 410 through a wave plate 1308 to compensate for the pretilt.

The output from LCD 1302 comprises a collimated object beam having local variations in the degree of polarization corresponding to the data embodied in the particular data slice displayed by LCD 1302. As such, it is necessary to convert the variations in polarization within the beam may be conveniently converted into variations in intensity, for example, through the use of a suitable output polarizer (transducer) 1304. Because high quality polarizers tend to be quite expensive, the polarization/intensity conversion may be suitably effected through the use of a smaller transducer 1306 interposed within the object beam downstream of projection lens 462 (where the beam o has a smaller cross-section).

Commercially available liquid crystal display (LCD) SLM's are typically designed for use with unpolarized light. Hence, conventional SLM's generally include an input polarizer such that unpolarized input light is converted to a desired polarization state before being modulated within the SLM. In addition, commercially available SLM's typically rotate the polarization at each pixel and include an output polarizer (transducer) configured to convert variations in polarization into corresponding variations in intensity. Inasmuch as high-quality polarizers tend to absorb light and are typically quite expensive, it may be advantageous to employ an SLM in the context of the present invention which does not include one or both of an input polarizer and an output polarizer. Indeed, the light entering the SLM in accordance with the preferred embodiments discussed herein will be typically purely polarized in any event, thus rendering a separate input polarizer for the SLM unnecessary. Moreover, the output of the SLM in the context of the preferred embodiments discussed herein will often be manipulated, e.g., by applying it to a diffusing screen or the like which may disrupt the polarization state of the output beam, whereupon the disrupted beam may be subsequently repolarized, as desired. That being the case, it is unnecessary to pass the beam as it leaves the SLM through a polarizer inasmuch as the polarization state of the SLM output beam will be subsequently disrupted and repolarized in any event.

By eliminating one or both of the input and output polarizer in the SLM, two levels of efficiency may be achieved:

(1) laser light is conserved to the extent unnecessary absorption of light in the input/output polarizer is eliminated; and (2) eliminating unnecessary hardware components reduces the cost of the assembly.

With reference to FIGS. 6 and 7, projection optics assembly 324 suitably comprises a projection lens 462, a mirror 464, and an aperture 466. Lens 462 preferably comprises a telocentric projection lens optimized for specific image sizes used on light valve 442 and rear projection screen 326. Lens 462 converges collimated beam 460 until the converging beam, after striking mirror 464, converges to a focal point, whereupon it thereafter forms a divergent beam 470 which effectively images the data corresponding to the then current data slice 14 onto projection screen 326 and onto film 319. Beam 470 passes through an aperture 466 at approximately the point where beam 470 reaches a focal point. Aperture 466 preferably comprises an iris diaphragm ID-0.5 manufactured by Newport. Note, however, that aperture 466 is substantially larger than the diameter of beam 470 at the point where the beam passes through aperture 466. This is in contrast to the pinhole apertures comprising beam expanders 314 and 322 which function to remove the high frequency components from the beam. The high frequency components within beams 460 and 470 are important in the present invention inasmuch as they may correspond to the data which is the subject of the hologram being produced. Aperture 466 simply traps and shunts scattered light and otherwise misdirected light carried by beam 470 or otherwise visible to projection screen 326 and which is not related to the information corresponding to the data on data slice 14.

With continued reference to FIG. 6, beam 470 is projected to apply a focused image onto rear projection screen 326. Screen 326 is suitably on the order of 14 inches in width by 12 inches in height, and preferably comprises a thin, planar diffusing material adhered to one surface of a rigid, transparent substrate, for example a 0.5 inch thick glass sheet 472. Diffuser 472 is fabricated from a diffusing material e.g., Lumiglas-130 manufactured by Stewart Filmscreen Corporation of Torrance, Calif. Diffuser 472 diffuses beam 470 such that each point within beam 470 is visible over the entire surface area of film 319. For example, an exemplary point Y on beam 470 is diffused by diffuser 472 so that the object beam at point Y manifests a conical spread, indicated by cone Y, onto film 319. Similarly, an arbitrary point X on diffuser 472 casts a diffuse conical spread X onto film 319. This phenomenon holds true for every point within the projected image as the image passes through diffuser 472. As a result, every point on film 319 embodies a fringe pattern which encodes the amplitude and phase information for every point on diffuser 472.

Since light from every point on diffusing diffuser 472 is diffused onto the entire surface of film 319, it follows that every point on film 319 "sees" each and every point within the projected image as the projected image appears on diffuser 472. However, each point on film 319 necessarily sees the entire image, as the image appears on diffuser 15 472, from a slightly different perspective. For example, an arbitrary point Z on film 319 "sees" every point on diffuser 472. Moreover, an arbitrary point W on film 319 also "sees" every point on diffuser 472, yet from a very different perspective than point Z. Thus, after emerging from diffuser 472 and polarizer 327, the diffuse image carried by object beam 473 is applied onto film 319.

Presently known diffusing screens typically comprise a sheet of plastic, glass, or the like which is either rough or which comprises particles which scatter light. Such diffusers are constrained by the simple physics of particle scattering, such that very little control may be exerted over the extent and direction of the random scattering.

To increase the efficiency of the diffusing screen, diffusing screen 472 may alternately comprise a holographic optical element (HOE).

More particularly, a hologram may be thought of as a controlled diffuser which diffuses the incoming uniform reference beam into an output of any desired pattern, which pattern may be of any desired degree of complexity.

A HOE diffuser may be conveniently constructed by applying diffused laser light to a holographic film substrate. Indeed, a very high-quality conventional plastic diffusing screen, which is itself extremely inefficient, may be employed to project a diffused pattern onto the holographic film. That is, the object beam used to create the HOE simply comprises the output of a high-quality conventional diffuser. By recording a hologram of this diffused laser light, a very efficient holographic diffusing screen may be produced. The HOE diffuser, being a hologram, comprises a highly efficient diffuser, which does not suffer from the inherent limitations of a conventional plastic diffuser, and particularly the undesirable scattering, absorption, and depolarizing characteristics of the conventional diffuser.

Polarizer 327 is advantageously mounted on the surface of diffusing diffuser 472. Although the light (beam 470) incident on diffusing diffuser 472 is substantially P-polarization diffuser 472, by its very nature, scatters the light passing therethrough, typically depolarizing some of the light. Polarizer 327, for example a thin, planer, polarizing sheet, repolarizes the light so that it is in a substantially pure P-polarization state when it reaches film 319. Note that polarizer 327 is disposed after diffuser 472, so that the light improperly polarized by diffuser 472 is absorbed. This ensures that a high percentage of the object beam, being substantially P polarized, will interfere with the reference beam at film 319, further enhancing the contrast of each hologram.

With continued reference to FIG. 6A, diffuser 472 may alternatively comprise a holographic optical element constructed in a known manner to implement the diffusing function. In yet a further alternative embodiment, an additional lens (not shown) may be placed adjacent to diffuser 472, for example between diffuser 472 and imaging assembly 328. Through the use of an appropriate lens, substantially all of the light emerging from diffuser 472 may be caused to emerge substantially orthogonally from diffuser 472. Consequently, the object beam may be caused to strike film substrate 319 in a substantially parallel manner, i.e., substantially all components of the object beam strike film substrate 319 substantially orthogonally thereto.

Returning briefly to FIG. 6B, those skilled in the art will appreciate that liquid crystal devices typically exhibit good contrast on the axis, with increasingly poor contrast the further off axis the liquid crystal display is viewed from. In the context of the present invention, it is highly desirable that the composite hologram exhibit high contrast from quite large angles, both up and down and from left to right. In this way, detailed analysis of the medical data may be viewed with full parallax from substantially large off-axis angles in all directions. Indeed, high contrast is desirable for viewing angles of up to 30–40 degrees off axis and greater from essentially all directions.

In accordance with an alternate embodiment of the present invention, high off-axis contrast may be achieved at the film surface by using an LCD to sequentially project each data slice on to the film. However, because of the poor off-axis contrast exhibited by typical LCD's, it is also desirable to place a diffuser immediately after the LCD, i.e., at the downstream surface of the LCD between the LCD and the film substrate. A lens may then be placed at the downstream surface of the diffusing screen (i.e., between the diffusing screen and the film surface). In this way, the high contrast on axis output of the LCD is scattered (diffused) by the diffuser, with the diffused image captured by the lens and projected on to the film. Because the image captured by the lens corresponds to the on-axis image scattered by the diffuser, the poor off-axis characteristics of the LCD are overcome, resulting in high off-axis contrast at the film surface.

The manner in which the complex object wave front travelling from diffuser 472 to film 319 is encoded within the film, namely in the form of a static interference pattern, is the essence of holographic reproduction. Those skilled in the art will appreciate that the interference (fringe) pattern encoded within the film is the result of constructive and destructive interaction between the object beam and the reference beam. That being the case, it is important that the object beam and reference beam comprise light of the same wavelength. Although two light beams of different wavelengths may interact, the interaction will not be constant within a particular plane or thin volume (e.g., the "plane" of the recording film). Rather, the interaction will be a time-varying function of the two wavelengths.

The static (time invariant) interaction between the object and reference beams in accordance with the pre-sent invention results from the monochromatic nature of the source of the reference and object beams (i.e., monochromatic laser sources 302 exhibiting an adequate coherence length). Moreover, those skilled in the art will further appreciate that maximum interaction occurs between light beams in the same polarization state. Accordingly, maximum interaction between the object and reference beams may be achieved by ensuring that each beam is purely polarized in the same polarization state at the surface of film 31 9. For films mounted in the configuration shown in FIG. 6A, the present inventor has determined that P polarized light produces superior fringe patterns. Thus, to enhance the interference between object beam 470 and reference beam 423, beam 47 passes through polarizing screen 327 adhered to the surface of diffuser 472.

The pure P polarized reference beam 423 passes through a collimating lens 316 and is collimated before striking film 319. Inasmuch as the reference and object beams both emanate from the same laser 302, and further in view of the relatively long coherence length of laser 302 relative to the differential path traveled by the beams from the laser to film 319, the reference and object beams incident on film 319 are mutually coherent, monochromatic (e.g., 514.5 nm), highly purely P polarized and, hence, highly correlated. In addition, reference beam 423 is highly ordered, being essentially noise free and collimated. Object beam 470, on the other hand, is a complicated wave front which incorporates the data from the current data slice. These two waves interact extensively within the volume of the emulsion comprising film 319, producing a static, standing wave pattern. The standing wave pattern exhibits a high degree of both constructive and destructive interference. In particular, the energy level E at any particular point within the volume of the emulsion may be described as follows:

$$E = |A_o \cos B_o + A_r \cos B_r|^2$$

where $A_o$ and $A_r$ represent the peak amplitude of the object and reference beams, respectively, at a particular point, and $B_o$ and $B_r$ represent, the phase of the object and reference beams at that same point. Note that since the cosine of the phase is just as likely to be positive as negative at any given point, the energy value E at any given point will range from 0 to $4A^2$ ($A_o = A_r$ for a unity beam ratio). This constructive and destructive wave interference produces well defined fringe patterns.

For each data slice, film 319 will be exposed to the standing wave pattern for a predetermined exposure time sufficient to convert that data slice's pro rata share of silver halide grains.

After film 319 is exposed to the interference pattern corresponding to a particular data slice, track assembly 334 is moved forward (or, alternatively, backward) by a predetermined amount proportional to the distance between the data slices. For example, if a life size hologram is being produced from CT data, this distance suitably corresponds exactly to the distance travelled by the subject (e.g., the patient) at the time the data slices were generated. If a less than or greater than life size hologram is being produced, these distances are varied accordingly.

In accordance with a preferred embodiment of the invention, film 319 suitably comprises HOLOTEST™ holographic film, for example film No. 8E 56HD manufactured by AGFA, Inc. The film suitably comprises a gelatinous emulsion prepared on the surface of a plastic substrate. An exemplary film may have a thickness on the order of 0.015 inches, with an emulsion layer typically on the order of approximately 6 microns.

In contrast to conventional photography, wherein amplitude information pertaining to the incident light is recorded within the film emulsion, a hologram contains a record of both amplitude and phase information. When the hologram is replayed using the same wavelength of light used to create the hologram, the light emanating from the film continues to propagate just as it did when it was frozen within the film, with its phase and amplitude information substantially intact. The mechanism by which the amplitude and phase information is recorded, however, is not widely understood.

As discussed above, the reference beam and object beam, in accordance with the present invention, are of the same wavelength and polarization state at the surface of film 319. The interaction between these two wave fronts creates a standing (static) wave front, which extends through the thickness of the emulsion. At points within the emulsion where the object and reference beam constructively interact, a higher energy level is present than would be present for either beam independently. At points within the emulsion where the reference and object beam destructively interact, an energy level exists which is less than the energy level exhibited by at least one of the beams. Moreover, the instantaneous amplitude of each beam at the point of interaction is defined by the product of the peak amplitude of the beam and the cosine of its phase at that point. Thus, while holographers speak of recording the amplitude and phase information of a wave, in practical effect the phase information is 'recorded' by virtue of the fact that the instantaneous amplitude of a wave at a particular point is a function of the phase at that point. By recording the instantaneous amplitude and phase of the static interference pattern between the reference and object beams within the three-dimensional emulsion, a "three-dimensional picture" of the object as viewed from the plane of film 319 is recorded. Since this record contains amplitude and phase information, a three-dimensional image is recreated when the hologram is replayed.

After every data slice comprising a data set is recorded onto film 319 in the foregoing manner, film 319 is removed from film holder 318 for processing.

As discussed above, the photographic emulsion employed in the present invention comprises a large number of silver halide crystals suspended in a gelatinous emulsion. While any suitably photosensitive element may be employed in this context silver halide crystals are generally on the order of 1,000 times more sensitive to light than other known photosensitive elements. The resulting short exposure time for silver halide renders it extremely compatible with holographic applications, wherein spurious vibrations can severely erode the quality of the holograms. By keeping exposure times short in duration for a given luer power, the effects of vibration may be minimized.

As also discussed above, a hologram corresponding to each of a plurality of data slices is sequentially encoded onto film 319. After every slice comprising a particular data set has been recorded onto the film, the film is removed from camera assembly 300 for processing. Before discussing the particular processing steps in detail it is helpful to understand the photographic function of silver halide crystals.

In conventional photography, just as in amplitude holography, a silver halide crystal which is exposed to a threshold energy level for a threshold exposure time becomes a latent silver halide grain. Upon subsequent immersion in a developer, the latent silver halide grains are converted to silver crystals. In this regard, it is important to note that a particular silver halide grain carries only binary data; that is, it is either converted to a silver crystal or it remains a silver halide grain throughout the process. Depending on the processing techniques employed, a silver halide grain may ultimately correspond to a dark region and a silver crystal to a light region, or vice versa. In any event, a particular silver halide grain is either converted to silver or left intact and, hence, it is either "on" (logic hi) or "off" (logic low) in the finished product.

In conventional photography as well as in amplitude holography, the exposed film is immersed in a developing solution (the developer) which converts the latent silver halide grains into silver crystals, but which has a negligible affect on the unexposed silver halide grains. The developed film is then immersed in a fixer which removes the unexposed silver halide grains, leaving clear emulsion in the unexposed regions of the film, and silver crystals in the emulsion in the exposed areas of the film. Those skilled in the art will appreciate that the convened silver crystals, however, have a black appearance and, hence, tend to absorb or scatter light, decreasing the efficiency of the resulting hologram.

In phase holography, on the other hand, the exposed film is bleached to remove the opaque convened silver, leaving the unexposed silver halide grains intact. Thus, after bleaching, the film comprises regions of pure gelatinous emulsion comprising neither silver nor silver halide (corresponding to the exposed regions), and a gelatinous emulsion comprising silver halide (corresponding to the unexposed regions). Phase holography is predicated on, inter alia, the fact that the gelatin containing silver has a very different refractive index than the pure gelatin and, hence, will diffract light passing therethrough in a correspondingly different manner.

The resulting bleached film thus exhibits fringe patterns comprising alternating lines of high and low refractive indices. However, neither material comprises opaque silver crystals, so that a substantially insignificant amount of the light used to replay the hologram is absorbed by the hologram, as opposed to amplitude holographic techniques wherein the opaque silver crystals absorb or scatter a substantial amount of the light.

More particularly, the present invention contemplates a six-stage processing scheme, for example, performed on a Hope RA2016V photoprocessor manufactured by Hope Industries of Willow Grove, Penn.

In stage 1, the film is developed in an aqueous developer to convert the latent silver halide grains to silver crystals, which may be made by mixing, in an aqueous solution (e.g., 1800 ml) of distilled water, ascorbic acid (e.g., 30.0 g), sodium carbonate (e.g., 40.0 g), sodium hydroxide (e.g., 12.0 g), sodium bromide (e.g., 1.9 g), phenidone (e.g., 0.6 g), and distilled water resulting in a 2-liter developing solution.

In stage 2, the film is washed to halt the development process of stage 1.

Stage 3 involves immersing the film in an 8 liter bleach solution comprising distilled water (e.g., 7200.0 ml), sodium dichromate (e.g., 19.0 g), and sulfuric acid (e.g., 24.0 ml). Stage 3 removes the developed silver crystals from the emulsion.

Stage 4 involves washing the film to remove the stage 3 bleach.

Stage 5 involves immersing the film in a 1 liter stabilizing solution comprising distilled water (50.0 ml), potassium iodide (2.5 g), and Kodak PHOTO-FLO (5.0 ml). The stabilizing stage desensitizes the remaining silver halide grains to enhance long-term stability against subsequent exposure.

In stage 6, the film is dried in a conventional hot-air drying stage. Stage 6 is suitably performed at 100 degrees fahrenheit; stages 1 and 3 are performed at 86 degrees fahrenheit; and the remaining stages may be performed at ambient temperature.

Upon completion of the processing of film 319, the resulting master hologram may be used to create one or more copies.

In accordance with one aspect of the invention, it may be desirable to produce a copy of the master hologram and to replay the copy when observing the hologram, rather than to replay and observe the master hologram directly. With reference to FIG. 10, FIG. 10A depicts a collimated replay beam PB replaying a master hologram, with beam PB being directed at the film from the same direction as the collimated reference beam used to create the hologram (H1). This is reflected to as orthoscopic reconstruction. This is consistent with the layout in FIG. 3, wherein the data slice corresponding to respective images 1002 in FIG. 10, were also illuminated onto the film from the same side of the film as the reference beam. However, when observed by an observer 1004, the reconstructed images appear to be on the opposite side of the film from the observer. Although the reconstructed images 1002 are not literally behind hologram H1, they appear to be so just in the same way an object viewed when facing a mirror appears to be behind the mirror.

With momentary reference to FIG. 10B, hologram H1 is inverted and again replayed with the replay beam PB. In this configuration, known as pseudoscopic construction, the images 1002 appear to the observer as being between the observer and the film being replayed. When master hologram H1 is copied using copy assembly 900, the pseudoscopic construction set forth in FIG. 10B is essentially reconstructed, wherein the master hologram is shown as H1, and a holographic film corresponding to the copy hologram is positioned within the images 1002 in a plane P. The assembly shown in FIG. 10B illustrates the copy film (plane P) as being centered within the images 1002, thereby yielding a copy hologram which, when replayed, would appear to have half of the three-dimensional image projecting forward from the film and half the three-dimensional image projected back behind the film. However, in accordance with an alternate embodiment of the present invention, the copy assembly may be configured such that plane P assumes any desired position with respect to the data set, such that any corresponding portion of the three-dimensional image may extend out from or into the plane in which the film is mounted.

Copy Assembly

Figure 9:
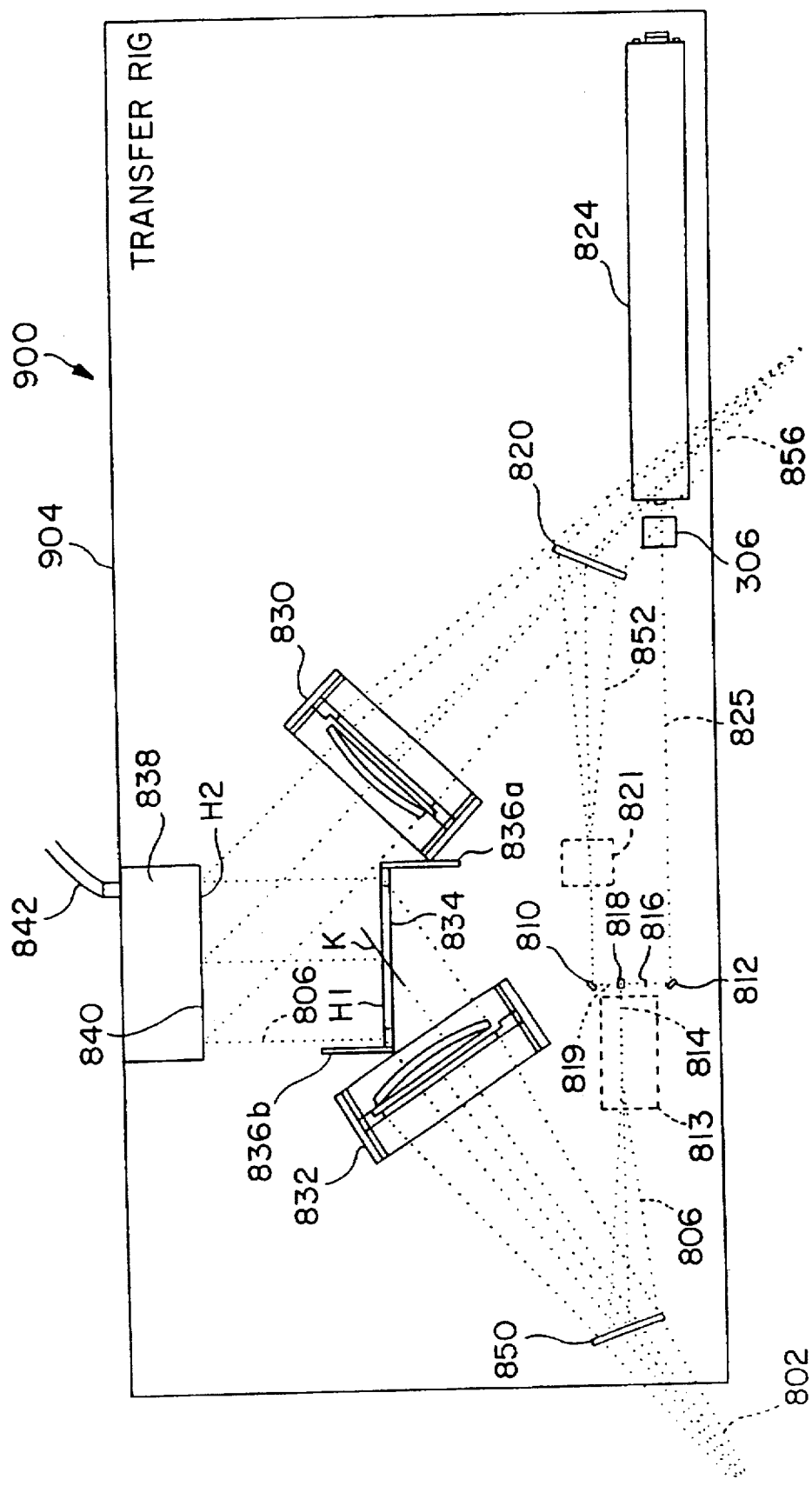
FIG. 9 shows a schematic layout of an exemplary copy rig in accordance with the present invention.

Referring now to FIG. 9, copy assembly 900 is suitably mounted to a table 904 in much the same way camera assembly 3 is mounted to table 304 as described in conjunction with FIG. 3. Copy assembly 900 suitably comprises a laser source 824, respective mirrors 810, 812, 820, and 850, a beam splitting cube 818, a wave plate 816, respective beam expanders 813 and 821, respective collimating lenses 830 and 832, a master film holder 834 having respective legs 836A and 836B, and a copy film holder 838 having, a front surface 840 configured to securely hold copy film substrate H2 in place.

Film holder 838 and, if desired, respective film holders 834 and 318 are suitably equipped with vacuum equipment, for example, vacuum line 842, for drawing a vacuum between the film and the film holder to thereby securely hold the film in place. By ensuring intimate contact between the film and the holder, the effects of vibration and other spurious film movements which can adversely impact the interference fringe patterns recorded therein may be substantially reduced.

Film holders 838 and 318 desirably comprise an opaque, non-reflective (e.g., black) surface to minimize unwanted reflected light therefrom. Film holder 834, on the other hand, necessarily comprises a transparent surface inasmuch as the object beam must pass therethrough on its way to film holder 838. Accordingly, the opaque film holders, may, if desired, comprise a vacuum surface so that the film held thereby is securely vacuum-secured across the entire vacuum surface. Film holder 834, on the other hand, being transparent, suitably comprises a perimeter channel wherein the corresponding perimeter of the film held thereby is retained in the holder by a perimeter vacuum channel. A glass or other transparent surface may be conveniently disposed within the perimeter of the channel and a roller employed to remove any air which may be trapped between the film and the glass surface.

Although a preferred embodiment of the present invention employs the foregoing vacuum film holding techniques, any mechanism for securely holding the film may be conveniently used in the context of the present invention, including the use of an electrostatic film holder; a pair of opposing glass plates wherein the film is lightly sandwiched therebetween; the use of a suitable mechanism for gripping the perimeter of the film and maintaining surface tension thereacross; or the use of an air tight cell wherein compressed air may be maintained within all to securely hold the film against one surface of the air tight chamber, the chamber further including a bleed hole, disposed on the surface of the cell against which the film is held, from which the compressed air may escape.

With continued reference to FIG. 9, laser source 824 is suitably similar to laser 302, and suitably produces laser light of the same wavelength as that used to create the master hologram (e.g., 514.5 nm). Alternatively, a laser source for producing the copy may employ a different, yet predetermined, wavelength of light, provided the angle that the reference beam illuminates film H1 is varied in accordance with such wavelength. Those skilled in the art will appreciate that the wavelength ($\lambda$) of the reference beam illuminating hologram H1 is proportional to the sine of its incident angle, e.g., $\lambda = K \sin \theta$. Moreover, by manipulating the processing parameters to either shrink or swell the emulsion, the relationship between the wavelength and the incident angle can be further adjusted in accordance with the relationship between the incident angle and a reference beam wavelength.

A source beam 825 from laser 824 is reflected off mirror 812 through a wave plate 816 and into cube 818. Variable wave plate 816 and cube 818 function analogously to beam splitting assembly 310 discussed above in conjunction with FIG. 3. Indeed, in a preferred embodiment of the present invention, a beam splitting assembly nearly identical to beam splitter 310 is used in copy system 900 in lieu of wave plate 816 and cube 818; however, for the sake of clarity, the beam splitting apparatus is schematically represented as cube 18 and wave plate 816 in FIG. 9.

Beam splitting cube 818 splits source beam 825 into an S polarized object beam 806 and a P polarized reference beam 852. Object beam 806 passes through a wave plate 814 which converts beam 806 to a P polarized beam, which then passes through a beam expanding assembly 813 including a pin-hole (not shown); reference beam 852 passes through a similar beam expander 821. Respective beam expanding assemblies 813 and 821 are similar in structure and function to beam expanding assembly 314 discussed above in conjunction with FIG. 3.

Object beam 806 emerges from beam expander 813 as a divergent beam which is reflected off mirror 850 and collimated by lens 832. Reference beam 852 is reflected off mirror 820 and collimated by lens 830. Note that virtual beams 802 and 856 do not exist in reality, but are merely illustrated in FIG. 9 to indicate the apparent source of the object and reference beams, respectively. Note also that object beam 806 and reference beam 852 are both pure P polarized.

The master hologram produced by camera assembly 300 and discussed above is mounted in a transparent film holder 834 and referred to in FIG. 9 as H1. A second film H2, suitably identical in structure to film substrate 319 prior to exposure, is placed in film holder 838. Object beam 806 is cast onto master hologram H1 at the Brewster's angle associated with film H1 (approximately 56°).

Film substrate H2 records the standing wave pattern produced by object beam 806 and reference beam 852 is the same manner as described above in connection with film 319 in the context of FIGS. 3 and 4. More particularly, the plurality of images corresponding to each data slice within a data set are simultaneously recorded onto film H2. The amplitude and phase information corresponding to each data slice is accurately recorded on film H2 as that amplitude and phase information exists within the plane defined by film H2. When copy hologram H2 is subsequently replayed, as discussed in greater detail below, the image corresponding to each data slice, with its amplitude and phase information intact, accurately recreates the three-dimensional physical system defined by the data set.

It will be appreciated that large collimating lenses such as reference beam collimating lens 316 (FIG. 3) are quite expensive. Although it is desirable in accordance with the illustrated embodiment to employ a collimated reference beam and a collimated object beam, one or both of the reference and object beam collimating lenses may be dispensed with in the context of an alternating embodiment.

More particularly, a divergent reference and/or object beam may be employed as opposed to two collimated reference and object beams in accordance with an alternate embodiment of the present invention. It is generally known, however, that the use of such divergent beams may result in distorted images at the film plane. However, the nature and extent of these distortions may be fairly precisely modeled and quantified. See, for example, the discussion by Edwin Champagne in the January, 1967 issue of the Journal of Electrical Society of America.

Specifically, by calculating the manner in which the use of one or more divergent beams will distort the image at the film plane, the date embodied in a data slice may be manipulated mathematically to compensate for this distortion. In this way, a properly reconstructed image may be obtained at the film surface notwithstanding the use of noncollimated reference and/or object beams.

With continued reference to FIG. 9, the present inventor has determined that the emulsion comprising the film within which holograms are made in accordance with the present invention may undergo subtle volumetric changes during processing. In particular, the emulsion may shrink or expand on the order of 1% or more, depending upon the particular chemistry involved in processing the substrate.

Although such shrinkage or expansion has a relatively minimal effect on a master hologram, this effect may be exaggerated in the conte)a of a copy hologram. Specifically, a 1% shrinkage in a typical hologram on the order of, for example, 10 centimeters, may be imperceptible to the observer; however, when the master hologram (H1) is copied onto a copy hologram (H2), a 1% change in master hologram H1 may manifest itself as a 1% change in the distance between master hologram holder 834 and copy hologram holder 838, which distance is generally far greater than the actual size of the hologram. Indeed, for a 14½ inch separation between master film holder 834 and copy film holder 838, a 1% shrinkage in the substrate comprising hologram H1 may result in the copy hologram being displaced from the film plane on the order of 5 millimeters.

To correct for such shrinkage/expansion and thereby ensure that copy hologram holder 838 H2 closely corresponds to the film plane of the hologram, the distance between master hologram holder 834 and copy hologram holder 838 may be suitably lo manipulated. In particular, if the emulsion comprising master hologram H1 shrinks by, for example, 1%, the distance between master hologram holder 834 and copy hologram holder 838 may be suitably decreased by approximately 1%. Similarly, to the extent the emulsion comprising the master hologram expands during processing, the foregoing distance may be correspondingly increased.

Moreover, the distance between master hologram holder 834 and copy hologram holder 838 may also be manipulated such that copy hologram holder 838 cuts through any desired position in the hologram. In particular, while it is often desirable for the copy hologram to straddle the film plane, i.e., for approximately one-half of the holographic image to be projected in front of the viewing screen and one-half of the hologram to be projected behind the film screen, by manipulating the distance between the master hologram holder and the copy hologram holder any desired portion of the hologram may be positioned in front of or behind the film plane, as desired.

In the preferred embodiment discussed herein, master holograms H1 are produced on a camera assembly 300, and copy holograms H2 are produced on a copy assembly 900. In an alternate embodiment of the present invention, these two systems may be conveniently combined as desired. For example, film holder 318 in FIG. 3 may be replaced with film holder 834 from FIG. 9, with a subsequent H2 film holder disposed such that the object beam is transmitted through film holder 834 onto the new H2 film holder. In this way, the relationship between film holders H1 and H2 (FIG. 9) would be substantially replicated in the hybrid system. To complete the assembly, an additional reference beam is confined to strike the new H2 film holder at Brewster's angle. As altered in the foregoing manner, the system can effectively produce master holograms and copies on the same rig. More particularly, the master hologram is produced in the manner described in conjunction with FIG. 3 and, rather than utilizing a separate copy rig, the master hologram may simply be removed from its film holder, inverted, and utilized to create a copy hologram. Of course, the original object, beam would be shunted, and replaced by a newly added reference beam configured to illuminate newly added film holder H2.

In yet a further embodiment of the present invention, which master holograms may be produced substantially in accordance with the foregoing discussion copy holograms may be suitably produced through a method known as contact copying. Specifically, a master hologram (H1) may be placed in intimate contact with a suitable sheet of film and a reference beam applied thereto, as is known in the context of producing copies of conventional holograms.

As discussed above, a master hologram (H1) produced in accordance with the illustrated embodiment results in a non-image plane hologram; the copy assembly described herein may thus be employed to generate an image planed hologram (H2) from the master hologram. Alternatively, various apparatus and techniques may be employed to generate an image planed hologram in a single step.

More particularly and with momentary reference to FIG. 3, in the preferred embodiment discussed above, the images corresponding to the slices are projected from screen 472 on to film holder 319 at a variable distance in the range of, e.g., 14 inches. Alternatively, the projection assembly may be brought very close to the film surface, such that some of the data slices (e.g., half of them) are projected on to one side of the film and, after turning the film over (and rotating it by 180 degrees) and projecting the remaining slices on to the other side of the film. In this way, an image planed hologram may be theoretically produced. However, it becomes difficult to apply a reference beam at a desired reference angle (e.g., Brewster's angle) to the film surface, in view of the close proximity of the projection assembly to the film plane.

Referring now to FIG. 12, a diffusing screen 1202 may be advantageously disposed very close to Film 319, such that the object beam 1204 applied to the input service of diffusing screen 1202, is diffused onto the film. In accordance with the embodiment shown in FIG. 12, diffuser 1202 is suitably anisotropic; that is, screen 1202 functions as a diffuser when object beam 1204 is applied to it, whereas screen 1202 permits reference beam 1206 to pass through it in a substantially transparent manner. In this regard, such an angle defective diffuser may be conveniently fabricated as a holographic optical element, such that it functions as diffuser for the object beam, yet acts like a transparent window with respect to the reference beam.

By properly configuring and positioning such a lens, the image on the projection screen (i.e., diffuser 472) may be focused on to film 319. By moving the projection assembly along track assembly 334 to thereby vary the distance between the diffusing screen/lens assembly and the film plane, the relative positions of the data slices within a data set may be preserved. However, the image for a particular slice will not necessarily be focused at the plane of the film substrate; rather, the image for each slice will be focused at a point in front of or behind the film substrate in accordance with the relative position of the particular data slice in the data set. However, since the film substrate will capture the phase as well as amplitude information of each slice, a properly positioned and properly focused image will be produced for each data slice upon replay of the finished hologram. Moreover, by properly configuring the aforementioned lens, an image planed hologram may be produced in a single step.

In accordance with a further alternative embodiment, to reduce the size, weight, and cost of such a projection lens, a HOE lens may be employed.

More particularly, such a HOE lens may be made by creating a hologram of a point source of light, for example a spherically irradiating point source. When the HOE lens is replayed, the output of the HOE lens will converge to the point source, effectively focusing light from a parallel beam to a point. As such, the HOE lens functions in a manner optically equivalent to a conventional glass lens.

As also discussed above, the present invention contemplates, for a data set comprising N slices, recording N individual, relatively weak holograms onto a single film substrate. To a first approximation, each of the N slices will consume (convert) approximately 1/N of the available silver halide grains consumed during exposure.

As a starting point, the total quantity of photosensitive elements within a film substrate may be inferred by sequentially exposing the film, in a conventional photographic manner, to a known intensity of light and graphing the extent to which silver halide grains are converted to silver grains as a function of applied energy (intensity multiplied by time). At various time intervals, the extent to which the film is fogged, i.e., the extent to which silver halide grains are converted to silver grains, is measured by simply exposing the film to a beam of known intensity, developing the film, and measuring the amount of light which passes through the film as a function of incident light. Although typical HD curves are nonlinear, they may nonetheless be used in the context of the present invention to ascertain various levels of fog as a function of applied energy.

In accordance with the present invention, the HD curve for a particular film (generally supplied by the film manufacturer) may be used to determine the amount of light, expressed in microjoules per square cm, necessary to prefog the film to a predetermined level, for example, to 10% of the film's total fog capacity as determined by the HD curve. After prefogging the film to a known level, a very faint, plane grating hologram is recorded onto the film, and the diffraction efficiency of the grating measured. Thereafter, a different piece of film from the same lot of film is prefogged to a higher level, for example to 20% of its total fog capacity based on its HD curve, and the same faint hologram superimposed on the fogged film. The diffraction efficiency of the faint hologram is again measured, and the process repeated for various fog levels. Thee diffraction efficiency of the grating for each fog level should be essentially a function of the pre-fog level, inasmuch as the prefogging is wholly random and does not produce fringe patterns of any kind.

A particular film lot may be conveniently characterized in terms of its multiple exposure holographic exposure capacity. For a data set comprising N slices, the film's total exposure capacity may be conveniently divided into N equal amounts, such that each data slice may consume 1/N of the film's total exposure capacity. Recalling that the energy for a particular slice is equal to the product of the intensity of the incident light and time of exposure, and further recalling that the intensity of the incident light (e.g., object beam) is determined for each slice in the manner described below in connection with the beam ratio determination, the time of exposure for every slice may be conveniently determined.

In accordance with a further aspect of the present invention, each lot of film may be conveniently coded with data corresponding to its total exposure capacity and/or incremental diffraction efficiency. Analogously, most conventional 35 mm film is encoded with certain information regarding the film, for example, data relating to the exposure characteristics of the film. In a similar way, the information pertaining to the film's diffraction efficiency curve may be conveniently appended to each piece of holographic film for use in the present invention, for example by applying it to the film or to the packaging therefor. The computer (not shown) used to control camera assembly 300 may be conveniently configured to read the data imprinted on the film, and may thereafter use this data to compute the exposure time for each data slice in the manner described herein.

As stated above, the relative intensities of the reference beam to the object beam at the film plane is known as the beam ratio. Known holographic techniques tend to define beam ratio without reference to a polarization state; however, an alternate definition of the term, particularly in the context of some aspects of the present invention, surround outside the relative intensities of the reference and object beams (at the film plane) at a particular common polarization state, i.e., either a common P polarization state or a common S portion state. Moreover, beam intensity, for purposes of determining beam ratio, may alternatively be defined in terms of any other desired characteristic or quality of a beam, for example by monitoring the mode of a beam through the use of a mode detector, or by monitoring beam uniformity, i.e., the amplitude of the beam a cross-section of the beam.

The intensity of a beam may be suitably detected at the film surface through the use of a photo-diode. In accordance with one aspect of the present invention, one or more photo-diodes may be suitably embedded in a convenient location within the hardware comprising camera system 300, for example, as part of film holder 319. In this regard, such a photo-diode may be embedded on the perimeter of the film holder (to the side of the film) or within the film holder itself, behind the transparent film. Alternatively, one or more photo-diodes may be suitably disposed on arms or similar lever mechanisms which may selectively inserted into and removed from the beam path, as desired.

For purposes of understanding the role of beam ratio in the present invention, it is helpful to point out that holography may be conveniently divided into display holography, in which the hologram is intended to show a three-dimensional image of a selected object, and Holographic Optical Elements (HOE) in which a basic holographic fringe pattern is recorded on a film which thereafter functions as an optical element having well-defined properties, for example, as a lens, mirror, prism, or the like.

HOEs are formed with simple directional beams leading to simple repetitive fringe patterns which tend to dominate weak secondary fringes which are also formed by scattered and reflected light within the emulsion. Since the secondary fringe patterns are typically ignored to the first approximation, conventional holographic theory states that to achieve the strongest interference between the two beams, a beam ratio of one should be employed.

In display holography, on the other hand, while the reference beam is still a simple directional beam, the object beam can be extremely complex, having intensity and direction variations imposed by the object. In addition, objects typically exhibit any number of bright spots which diffuse light at fairly high intensities.

The resulting fringe pattern is extremely complex, bearing no simple relationship to the object being recorded. Moreover, the bright spots (highlights) on the object act as secondary reference beams, producing unwanted fringe patterns as they interfere with the reference beam and with each other, resulting in many sets of noise fringes, effectively reducing the relative strength of the primary fringe pattern. The resulting "intermodulation" noise (also referred to as self-referencing noise) causes an unacceptable loss of image quality unless it is suppressed.

Conventional holographic theory states that intermodulation noise may be suppressed by increasing the relative strength of the reference beam, with respect to the object beam, by selecting a beam ratio in the range of 3 to 30, and most typically between 5 and 8. This results in strong primary fringes and greatly reduced secondary fringes (intermodulation noise). Thus, existing holographic techniques suggest that, in the context of display holography, a beam ratio higher than unity and preferably in the range of 5–8:1 substantially reduces intermodulation noise.

The diffraction efficiency of a hologram, i.e., how bright the hologram appears to an observer, also exhibits a maximum at a beam ratio of one. At beam ratios higher than one, the diffraction efficiency falls off, resulting in less bright holograms when replayed. The conventional wisdom in existing holographic theory, however, states that since intermodulation noise falls off faster than diffraction efficiency as the beam ratio increases, a beam ratio of between 5–8:1 minimizes intermodulation noise (i.e., yields a high signal to noise ratio) while at the same time producing holograms exhibiting reasonable diffraction efficiency.

In the context of the present invention, a very low reference-to-object beam ratio, for example on the order of 3:1 and particularly on the order of unity, is desirably employed, resulting in optimum (e.g., maximum) diffraction efficiency for each hologram associated with every data slice in a particular data set. In the context of the present invention, however, intermodulation noise (theoretically maximum at unity beam ratio) does not pose a significant problem as compared to conventional display holography. More particularly, recall that intermodulation noise in conventional holography results from, inter alia, bright spots associated with the objects. In the present invention, the "objects" correspond to a two-dimensional, windowed, gamma-corrected (discussed below) data slice. Thus, the very nature of the data employed in the context of the present invention results in inherently low intermodulation noise, thus permitting the use of a unity beam ratio and permitting maximum diffraction Moreover, efficiency and very high signal to noise ratio images.

Moreover, the selection of a near-unity or unity beam ratio for each slice in a data set may be accomplished quickly and efficiently in the context of a preferred embodiment of the present invention.

More particularly, variable wave plate 404 may be calibrated by placing a photodiode in the path of the reference beam near film 319 while shunting the object beam, and vice versa. As the applied voltage to wave plate 404 is ramped up at predetermined increments from zero to a maximum value, the intensity of the reference beam may be determined as a function of input voltage. Since the intensity of the reference beam, plus the intensity of the object beam (before a data slice is incorporated into the object beam), is approximately equal to the intensity of their common source beam and the intensity of the common source beam is readily ascertainable, the pure object beam intensity as a function of voltage applied to wave plate 404 may also be conveniently derived. It remains to determine the proper input voltage to wave plate 404 to arrive at a unity beam ratio for a particular slice.

At a fundamental level, each data slice comprises a known number of "pixels" (although not literally so after having passed through imaging assembly 328), each pixel having a known grey level value. Thus, each data slice may be assigned a brightness value, for example, as a percent of pure white. Thus, the particular voltage level required to obtain a unity beam ratio for a particular data slice having a known brightness value may be conveniently determined by selecting the unique voltage value corresponding to a pure object beam intensity value which, when multiplied by the brightness value, is equal to the reference beam intensity value for the same voltage level. This computation may be quickly and efficiently carried out by a conventional computer programmed in accordance with the relationships set forth herein.

Accordingly, each data slice has associated therewith a voltage value corresponding to the input voltage to wave plate 404 required to achieve a unity beam ratio.

With momentary reference to FIG. 6A, as the diffusing screen is placed further from the film substrate, the object beam intensity at the film surface becomes more uniform. Conversely, as the diffusing screen gets closer and closer to the film surface, the object beam at the film surface becomes less uniform, i.e., localized regions of high intensity and low intensity may be observed as a function of the particular data comprising the object beam, notwithstanding the presence of evenly relatively high-quality diffusers.

In order to enhance control of the beam ratio at the film surface, it may be desirable to modulate the reference beam intensity (amplitude) distribution to more closely correspond to the object beam intensity distribution at the film surface. Enhanced control of the beam ratio at the film surface is particularly advantageous when producing a copy (H2), but may also be helpful to a lesser extend in the context of the master (H1) hologram.

At a first level of approximation, the intensity distribution of the reference beam over a cross-section of the reference beam may be modeled as a Gaussian distribution (see, e.g., FIG. 5). Thus, in accordance with one embodiment of the present invention, the reference beam at the film surface may exhibit an essentially Gaussian intensity distribution, such that a different beam ratio will be observed near the center of the film than may be observed at the outer edges of the film.

This may be corrected to a first-level of approximation by incorporating a filter (not shown) into the reference beam, which filter is configured to flatten out the Gaussian intensity distribution within a cross-section of the reference beam. In particular, such a filter may be configured to minimally suppress (e.g., absorb, scatter, or redirect) the beam near the outer edges of the film, while more substantially suppressing the beam near the center of the film. In this way, a substantially uniform reference beam intensity distribution may be obtained at the film surface, thereby resulting in a more uniform beam ratio at the film surface.

In accordance with an alternate embodiment, the reference beam intensity distribution may be modulated through the use of a SLM or similar device interposed into the reference beam. The intensity distribution within the object beam at the film surface may also be measured, inferred, or calculated in any convenient manner, for example, through the use of a video camera or otherwise photo-voltaically or photo-optically measuring the object beam brightness level at various points on the film surface. Having ascertained the intensity distribution in the object beam at the film surface, this information may be fed back into the SLM in the reference beam, such as the SLM modulates the reference beam in accordance with the intensity distribution of the object beam at the film plane. This permits substantially improved control over the localized beam ratio across the film surface.

Alternatively, the reference beam projection optics may be configured to expand the cross-section of the beam and to clip the relatively low intensity perimeter of the beam, for example by electronically, optically, or mechanically masking the outer edges of the beam, leaving the expanded higher intensity portion of the middle of the beam intact.

In a further alternative embodiment, a SLM, LCD, or similar functional device may be interposed in the reference beam, and configured to compensate for the Gaussian or other reference beam intensity distribution, for example by making the LCD dark in the middle and lighter at the edges, in radial fashion, to thereby flatten the intensity distribution of the reference beam. In this way, the SLM may be configured to implement the function of an apedizing filter. As a further alternative, a glass filter which is darker in the middle than at the edges may be interposed in the reference beam, either alone or in combination with a SLM for controlling the intensity distribution of the reference beam.

In a further alternative embodiment, the intensity distribution of the reference beam may be manipulated optically, for example, through the use of a lens or series of lenses to redirect portions of the reference beam to achieve a substantially uniform cross-sectional intensity distribution.

In yet a further alternate embodiment, the intensity distribution of the object beam at the film surface may be calculated based on the various physical and optical parameters associated with the hologram camera and/or copy assembly.

More particularly, for a given data slice applied to diffusing Screen 472, the intensity distribution at the input of Screen 472 may be derived as a function of the data on the slice and the optics employed to project the image onto Screen 472. In conjunction with, inter alia, the known optical properties of diffusion Screen 472, the distance between the diffuser and film plane, and the optical properties of any polarizers or other hardware employed in the projection optics, the intensity distribution at the film plain may be conveniently computed, at least to a reasonable approximation.

In accordance with another aspect of the present invention, each data slice comprising a data set may be further prepared subsequent to the windowing procedures set forth above. In particular, imaging assembly 328 generates an image comprising various brightness levels (grey levels) in accordance with data values applied to CRT 444. However, it is known that conventional CRTs and conventional light valves do not necessarily project images having brightness levels which linearly correspond to the data driving the image. Moreover, human perception of grey levels is not necessarily linear. For example, while a image having an arbitrary brightness value of 100 may look twice as bright as an image having a brightness value of 50, an image may require a brightness level of 200 to appear twice as bright as the image having a brightness value of 100.

Because human visual systems generally perceive brightness as an exponential function, and CRTs and hot valves produce images having brightness which are neither linearly nor exponentially related to the levels of the data driving the images, it is desirable to perform a gamma correction on the data slices after they have been windowed, i.e., after they have been adjusted at a gross level for brightness and contrast levels. By gamma correcting the windowed data, the grey levels actually observed are evenly distributed in terms of their perceptual differences.

In accordance with a preferred embodiment of the present invention, a gamma lookup table is created by displaying a series of predetermined grey level values with imaging assembly 328. A photo-diode (not shown) is suitably placed in the path of the output of imaging assembly 328 to measure the actual brightness level corresponding to a known data value. A series of measurements are then taken for different brightness levels corresponding to different grey level data values, and a gamma lookup table is constructed for the range of grey values exhibited by a particular data set. Depending on the degree of precision desired, any number of grey level values may be measured with the photo-diode, allowing for computer interpolation of brightness levels for grey values which are not measured optically.

Using the gamma lookup table, the data corresponding to each data slice is translated so that the brightness steps of equal value in the data correspond to visually equivalent changes in the projected image, as measured by the photo-diode during creation of the lookup table.

Moreover, light valve 442, when used in conjunction with wave plate 463 as discussed in the context of FIGS. 7–8, is typically capable of producing a blackest black image on the order of about 2000 times as faint as the brightest white image. This level of contrast range is simply unnecessary in view of the fact that the human visual system can only distinguish within the range of 50 to 100 grey levels within a single data slice. Thus, the maximum desired contrast ratio (i.e., the brightness level of the blackest region on a slice divided by the brightness level of the brightest white region on a slice) is desirably in the range of 10020:1, allowing for flexibility at either end of the brightness scale. Since the contrast ratio of a particular slice is thus on the order of one-tenth the available contrast ratio producible by the right valve, a higher aspect of the gamma correction scheme employed in the context of the present invention surrounds defining absolute black as having a brightness level equal to zero. Thereafter, a subjective determination is made that the darkest regions of interest on any slide, i.e., the darkest region that a radiologist would be interested in viewing on a slice, would be termed "nearly black." These nearly black regions would be mapped to a value which is on the order of 100–200 times fainter than pure white. Moreover, any values below the nearly black values are desirably clamped to absolute black (zero grey value). These absolute black regions or super black regions comprise all of the regions of a slice which are darker than the darkest region of interest.

An additional gamma correction step employed in the present invention surrounds clamping the brightest values. Those skilled in the art will appreciate that conventional CRTs and light valves are often unstable at the top of the brightness range. More particularly, increasing the brightness level of data driving an image in any particular CRT/light valve combination above the 90% brightness level may yield images having very unpredictable brightness levels. Thus, it may be desirous to define the upper limit of brightness level for a data set to coincide with a predetermined brightness level exhibited by imaging assembly 328, for example, at 90% of the maximum brightness produced by imaging assembly 328. Thus, pure white as reflected in the various data slices will actually correspond to 10% less white than imaging assembly 328 is theoretically capable of producing thereby avoiding nonlinearities and other instabilities associated with the optical apparatus.

Finally, if any slice is essentially black or contains only irrelevant data, the slice may be omitted entirely from the final hologram, as desired.

Thus, in accordance with one aspect of the present invention, the intensity of the object beam may suitably be controlled as a function of one or more of a number of factors, including, inter alia, the voltage level applied to wave plate 404, the data distribution for a particular data slice, the axial position of a data slice with respect to the film holder, and the effects of gamma correction performed on the data.

As discussed above, the exposure time for each data slice may be conveniently determined as a function of one or more parameters, including the desired beam ratio, the total number of slices in the data set, and the aggregate gray scale value (brightness level) for a particular data slice. In accordance with one aspect of the present invention, relatively bright slices require a relatively short exposure time, whereas relatively faint (dark) slices require a longer exposure time. In this way, each slice may thus consume an appropriate (e.g., proportional) share of photosensitive elements within the film emulsion.

Relatively long exposure times may be disadvantageous in several respects. For example, the longer the exposure, the more likely it is that spurious phenomena may adversely effect the quality of the hologram. Such spurious effects include, among other things, vibration, drift in beam intensity or in various projection optics parameters, temperature, humidity, coherence length of the laser source, and the like. It may thus be desirable to reduce the exposure time for relatively faint slices.

In accordance with one aspect of the present invention, the exposure time for some or all of the slices comprising a particular data set may be reduced by artificially boosting the aggregate brightness level for one or more of the slices by a predetermined amount. This is suitably accomplished by interposing phantom bright pixels to the slice, in a minimally intrusive manner.

For example, an asteroid may be placed in a dark region of the slice remote from the relevant data. In this way, the aggregate brightness level for a particular slice may be boosted without affecting the brightness levels of the pixels which comprise the relevant data embodied in the slice.

In accordance with a further aspect of the foregoing asteroid technique, the phantom brightness regions may take any desirable form or shape, but are preferably configured as clouds, asteroids, or other random (e.g., irregular) shapes. In this regard, the use of regular shapes having sharp contrast edges (e.g., rectangular shapes) may result in undesirable side effects. For example, to the extent similar geometric patterns appear from slice-to-slice, erroneously strong or weak fringes for this pattern may be inadvertently produced. This may result in aliasing, undesired intermodulation noise, or the like.

As discussed in greater detail below, once a composite hologram (master hologram) is produced it may be desirable to make a copy of the master hologram, which copy is suitably an image plane hologram. In this context, it may be desirable to mask the various asteroids such that they do not appear on the image plane (copy) hologram. This may be done by simply physically masking the holographic asteroids to optically isolate them from the copy mechanism. In this regard, masking of the holographic asteroids is facilitated if all of the asteroids for the various slices within a data set fall within a single plane, for example, in the plane of the filmholder for the copy hologram (discussed in greater detail below in conjunction with FIGS. 9 and 10). In order to facilitate the placement of all asteroids in a single plane, it may be desirable to project the asteroids onto the master hologram from a fixed location for all slices; that is, as the camera assembly moves relative to the master hologram film plane as the master hologram is produced, it may be desirable to maintain the asteroid projection mechanism (e.g., the variable intensity polarizer discussed above) at a fixed location corresponding to the H2 (copy hologram) film plane during production of the H1 (master) hologram.

By artificially boosting the brightness level for faint slices in accordance with the foregoing asteroid technique, the dynamic brightness range among the various slices may be desirably reduced, such that the range of exposure times for the various slices comprising a particular data set may also be reduced.

In a typical data set, it may be desirable to artificially boost the brightness level of only those data slices falling below a predetermined aggregate brightness threshold. Alternatively, it may also be desirable to add an asteroid to even the brighter (i.e., high gray scale value) slices, for example preserve the relative aggregate gray scale levels for the various slices comprising the data set or if all data slices within a particular data set are too faint. In this regard, it should be noted that the brightness level of each asteroid may be selected to boost each slice to a desired gray scale value.

By adding an asteroid to a relatively faint data slice, it is believed that the fringe patterns produced in the film substrate for a particular data slice will be sharper and, hence, a higher contrast ratio for each data slice will be achieved, thereby producing a sharper composite hologram. This is so even though the gray scale values for the various pixels comprising the relevant data under examination for each data slice remains unaltered. That is, by adding an asteroid to a faint data slice, the fringe pattern for that data slice is enhanced even though the amount of light passing through the pixels which comprise the relevant data remains unchanged.

Viewing Assembly

Copy hologram H2 is suitably replayed on a viewing device such as the VOXBOX® viewing apparatus manufactured by VOXEL, Inc. of Laguna Hills, Calif. Certain features of the VOXBOX® viewing apparatus are described in U.S. Pat. Nos. 4,623,214 and 4,623,215 issued Nov. 18, 1986.

Referring now to FIG. 11, an exemplary viewing apparatus 1102 suitably comprises a housing 1104 having an internal cavity 1106 disposed therein, housing 1104 being configured to prevent ambient or room light from entering the viewing device.

Viewing apparatus 1102 further comprises a light source 1108, for example a spherically irradiating white light source, a baffle 1132, a mirror 1134, a Fresnel lens 1110, a diffraction grating 1112, and a Venetian blind 1114 upon which copy hologram H2 is conveniently mounted. Venetian blind 1114 and hologram H2 are schematically illustrated as being separated in space from diffraction grating 1112 for clarity, in a preferred embodiment of the device, Fresnel lens 1110 suitably forms a portion of the front surface of housing 1104, diffraction grating 1112 forms a thin, planar sheet secured to the surface of lens 1110, and Venetian blind 1114 forms a thin planar sheet secured to grating 1112. Hologram H2 is suitably removably adhered to Venetian blind 1114 by any convenient mechanism, for example by suitable clips, vacuum mechanisms, or any convenient manner which permits hologram H2 to be intimately yet removably bonded to the surface of Venetian blind 1114.

Fresnel lens 1110 collimates the light produced by light source 1108 and directs the collimated through diffraction grating 1112. The desired focal length between source 1108 and lens 1110 will be determined by, inter alia, the physical dimensions of lens 1110. In order to conserve space and thereby produce a compact viewing box 1102, the light from source 1108 is suitably folded along its path by mirror 1134. Since source 1108 may be placed near lens 1110 in order to maximize space utilization, baffle 1132 may be conveniently disposed intermediate source 1108 and lens 1110, such that only light which is folded by mirror 1134 strikes 1110. As discussed above, the relationship between this angle and wavelength are similarly governed by the equation λ=K sin θ. In a preferred embodiment of the present invention, the focal length of lens 1110 is approximately 12 inches.

Diffraction grating 1112 suitably comprises a holographic optical element (HOE), for example one produced by a holographic process similar to that described herein. More particularly, diffraction grating 1112 is suitably manufactured using a reference and an object beam having a wavelength and incident angle which corresponds to that used in producing hologram H2 (here 514.5 nm). In a preferred embodiment, diffraction grating 1112 is advantageously a phase hologram.

Diffraction hologram 1112 suitably diffracts the various components of the white light incident thereon from source 1108 as a function of wavelength. More particularly, each wavelength of light will be bent by a unique angle as it travels through diffraction grating 1112. For example, the blue component of the white light will bend through an angle P; the higher wavelength green light component is bent at a greater angle Q; and the higher wavelength red light is bent at an angle R. Stated another way, diffraction grating 1112 collimates each wavelength at a unique angle with respect to the surface of the grating. Those skilled in the art will appreciate, however, that diffraction grating 1112 is an imperfect diffractor; thus, only a portion of the incident light is diffracted (e.g., 50%), the remainder of the undiffracted light passes through as collimated white light.

Venetian blind (louvers) 1114 comprises a series of very thin, angled optical slats which effectively trap the undiffracted white light passing through grating 1112. Thus, substantially all of the light passing through louvers 1114 passes through at an angle, for example the angle at which the light was diffracted by grating 1112. Of course, a certain amount of light will nonetheless be deflected by the louvers and pass through at various random angles.

Moreover, the geometry of the slats comprising louvers 1114 may be selected to produce a resulting hologram with optimum colorization. More particularly, the slat geometry may be selected so that certain wavelengths pass through louvers 1114 essentially intact (the nominal wave band), whereas wavelengths higher or lower than the nominal wavelength will be clipped by the louvers. Moreover, the geometry of the slats may be selected such that light which passes through grating 1112 undiffracted does not pass directly through louvers 1114. By coordinating slat geometry, undiffracted light may be substantially attenuated, for example, by causing such undiffracted light to reflect a number of times (e.g., four) between adjacent slats before reaching hologram H2.

Louvers 1114 suitably comprise a thin, planar light control film manufactured by the 3M Company. On one surface, louvers 1114 are slightly convex; moreover, a greasy or waxy substance is apparently applied to this surface by the manufacturer. To avoid damage to the delicate slats, it may be desirable to adhere the Louvers to a protective surface, for example, an acrylic sheet (not shown). Improper application of the "greasy" side of louvers 1114 to an acrylic sheet may, however, produce a nonuniform contact interface between the two surfaces, which could produce undesirable optical characteristics.

The present inventor has determined that applying a thin coating to a high-lubricity particulate substance (e.g., talc) at this interface tends to yield a contact surface between the acrylic sheet and the Louvers having improved optical characteristics.

Hologram H2 is illustratively placed onto the viewing screen, for example by adhering it to the surface of louvers 1114. In this regard, the viewing screen suitably comprises one or more of the following components: lens 1110; grating 1112; and Venetian blind 1114. Alternatively, the viewing screen may simply comprise a thin, planar sheet of transparent material for example glass, upon which one or more of the foregoing components may be conveniently mounted. In accordance with one aspect of the present invention, such a viewing screen is suitably on the order of 10 to 16 inches in width, and on the order of 14 to 20 inches in height, and most preferably on the order of 14 by 17 inches. Consequently, it is also desirable that the various holograms made in accordance with the present invention, namely master hologram H1 and copy hologram H2, be of suitable dimensions so that they are either smaller than or approximately as large as the viewing screen. In a particularly preferred embodiment master hologram H1 and copy hologram H2 each are suitably 14 by 17 inches.

Since hologram H2 is suitably produced using the same wavelength and reference beam angle as was used to produce grating 1112, light passing through hologram H2 is bent in accordance with its wavelength. Specifically, blue light is bent at an angle of minus P, green light is bent at an angle of minus O, and red light is bent at an angle of minus R (recall that master hologram H1 was inverted during the production of copy hologram H2). Consequently, all wavelengths pass through hologram H2 substantially orthogonally to the plane of lens 1110. As a result, an observer 1116 may view the reconstructed hologram from a viewpoint substantially along a line orthogonal to the plane of hologram H2.

By coordinating the wavelength-selective diffraction capacity of diffraction grating 1112 with the wavelength-selective diffraction properties of hologram H2, substantially all of the light diffracted by diffraction grating 1112 may be used to illuminate the hologram. Thus, even the use of a relatively inefficient diffraction grating 1112 produces a relatively bright holographic image. Moreover, the holographic image is not unnecessarily cluttered by spurious white hot which is not diffracted by grating 1112, inasmuch as a substantial amount of this spurious light will be blocked by louvers 1114.

Moreover, by mounting the thin, planar hologram, louvers, and diffraction grating on the surface of a lens which forms a portion of the viewing apparatus, the replay beam used to illuminate the hologram is substantially exclusively limited to the collimated light from source 1108; that is, spurious noncollimated light is prevented from striking the rear surface (right-hand side in FIG. 11) of hologram H2.

Alternative Light Control Film Embodiments

Referring now to FIG. 13, in accordance with an alternative embodiment of ewing assembly 1102, a light control film 1310 may be suitably employed in lieu of louvers 1114.

More particularly, light control film 1310 suitably comprises a thin, transparent film laminate made from a plurality of thin planar sheets sandwiched together, as described in greater detail below. In the embodiments set forth in FIG. 14, light control film (LCF) 1310 comprises three laminated sheets, namely a front sheet 1402, a core sheet, 1404, and a back sheet 1406. Each of the foregoing sheets comprises a thin, transparent film, with a series of thin, parallel, opaque lines extending across the entire surface of the film. To illustrate the optical properties of LCF 1310, these sheets are shown in cross-sections; for clarity, a front view of an exemplary sheet 1402 is shown in FIG. 15, with the thickness of the opaque lines exaggerated for illustration purposes. Respective opaque lines 1402A, 1402B, 1402C, etc. shown in FIG. 15 may be seen in cross-section in FIG. 14. Respective sheets 1404 and 1406 are suitably similar or identical to sheet 1402.

With continued reference to FIG. 14, LCF 1310 is conveniently viewed as a light filter, such that the duty cycle of a constituent sheet (e.g., sheet 1402) is a function of the width W1 of an exemplary opaque line (e.g., line 1402A relative to the width W2 of the distance between consecutive lines). I the embodiments shown in FIG. 14, each of the respective sheets 1402–1406 suitably exhibit an opaque duty cycle on the order of 50%, i.e., W1 is approximately equal to W2.

The quality of grating 112 may be expressed in terms of its ability to selective)y diffract incoming white like 1408. As discussed above in connection with FIG. 11, diffraction grating 1112 diffracts light at an angle as a function of wave length. For example, red light rays 1410 are diffracted at a relatively steep angle from the horizontal, green light 1412 is diffracted at less than red light, and blue light 1414 is diffracted at a relatively small angle from the horizontal.

Diffraction gratings are typically not 100% efficient. Thus, a considerable amount of undiffracted light inevitably passes through grating 112. In the context of the present invention, undiffracted light which passes through grating 1112 is referred to herein as zero order light 14–16, whereas the diffracted light (e.g., rays 1410–1416) are referred to as first order diffracted light.

To facilitate the reconstruction of a sharp, high contract, hologram, LCF 1310 is suitably configured to block zero order light 1416 such that it is not viewed by viewed 1116, and at the same time to pass the diffracted first order light therethrough. As discussed above in conjunction with FIG. 11, the first order light which passes through LCF 1310, will be inversely diffracted by the hologram and directed horizontally to be viewed by the observer.

In accordance with a first embodiment of LCF 1310 shown in FIG. 14, front sheet 1402 is suitably disposed with respect to back sheet 1406 such that their respective opaque and transparent lines are aligned. Core sheet 1404, on the other hand, is suitably disposed such that its opaque lines 1404A, 1404B, etc. are in registration with the transparent portions of front sheet 1402 and back sheet 1406, while the opaque portions of core sheet 1404 are disposed in registration with the transparent portions of front sheet 1402 and back sheet 1406. Consequently, most of the zero order light which passes through grating 1112 will be blocked by LCF 1310. However, the present inventor has observed that a small amount of zero order light, as shown for example at ray 1416A, inevitably passes through LCF 1310. The zero order light 1416A which passes through LCF 1310 may be attributed to several factors, including: vertical misalignment of one or more of sheets 1402–1406; flaws or imperfections in the opacity, width W1, parallelism, or position of one or more of the opaque lines comprising one or more of sheets 1402–1406; refraction of light through LCF 1310, and diffraction of zero order light around one or more of the edges of the opaque lines comprising LCF 1310.

Accordingly, while the embodiments set forth in FIG. 14 produces acceptable results, alternate configurations of light control film may also be employed in the context of the present invention.

Referring now to FIG. 16, an alternate embodiment of light control film 1610 suitably comprises a front sheet 1602, a core sheet 1604, and a back sheet 1606, wherein the relative dimensions of the various opaque lines comprising sheets 1602–1606 are suitably manipulated such that opaque lines 1604A, 1604B, etc. "overlap" the edges of the opaque lines comprising respective front and back sheets 1602 and 1606. The configuration shown on FIG. 16 substantially reduces the extent to which zero order light may diffract around the opaque lines embodied in LCF 1610. Alternatively, the plurality of core sheets having substantially thinner (dimension W1) opaque lines may be employed, with the opaque lines of the core sheets being staggered in various configurations to preclude the passage of zero order light through the light control film. However, the usefulness of such embodiments are limited to the extent they also tend to block the passage of first order light therethrough, for example, narrowing the band width of first order light which can pass through the various layers comprising the light control film.

More particularly and with momentary reference to FIG. 17, even a relatively small overlap 1708 in the width of opaque lines 1704A and 1704B can significantly reduce the amount of first order light which passes through LCF 1710 for certain wave lengths from a first amount defined by pathway 1712 to a second amount defined by pathway 1714.

With continued reference to FIGS. 14–17, it can be seen that the vertical uplifting of one or both of the front and back sheets tends to block wave lengths at the extreme ends of the band width for which the light control film is designed to pass. It can also be seen that vertical shifting of the core (intermediate) sheets tends to reduce the amount of intermediate wave lengths which pass through the LCF. Ideally, an LCF should be configured to pass all desired first order wave lengths equally well, while blocking substantially all zero order light.

Referring now to FIG. 18, an alternate LCF embodiment is shown which substantially decouples the zero order blocking capability of the LCF from the LCF's capacity to pass first order light.

Referring now to FIG. 18, an alternative embodiment of an LCF 1810 suitably comprises a front layer 1802, a core layer 1804, and a back layer 1806. In accordance with one aspect of LCF 1810, back layer 1806 may be thought of as a datum, whereupon shifting of front layer 1802 results in color selectivity, and a corresponding shift in core layer 1804 provides good zero order blocking.

As shown in FIG. 18, substantially all of the zero order light 1416 which passes through grating 1112 will be blocked by LCF1810. In addition, LCF 1810 is configured to facilitate passage of a desired band width of first order diffracted light therethrough. The particular arrangement of the various sheets comprising composite LCF 1810 are conveniently described in the context of a preferred embodiment whereby LCF 1810 is constructed. Accordingly, a detailed methodology for manufacturing LCF 1810 will now be described.

With continued reference to FIG. 18, LCF 1810 is suitably manufactured using a sturdy, flat, viewing apparatus of the type discussed above in conjunction with FIG. 11, rotated approximately 90° such that the viewing screen is substantially horizontal and may thus be viewed by the operator during assembly of LCF 1810. In the context of FIG. 18, grating 1112 would thus be oriented horizontally, with respective sheets 1802, 1804, and 1806 assembled with back sheet 1806 on the bottom and front sheet 1802 on top, as described in greater detail below.

As an initial manufacturing step, a protective glass sheet 1816, for example a ⅛" slab of glass, is suitably laid horizontally on top of the surface of viewing screen 1818 to avoid damage to the viewing screen during assembly of LCF 1810. Thereafter, it may be desirable to place a protective coating over the glass, for example a thin, transparent polyester, sheet (polyester sheet 1820) to prevent any adhesives used during assembly from contacting glass sheet 1816.

To facilitate handling and installation of laminated LCF 1810, it may be desirable to construct the laminate as a composite, wherein LCF 1810 is sandwiched between respective sheets of glass 1822 and 1824. Accordingly, rear sheet 1822 is suitably thoroughly cleaned and placed on top of polyester protective sheet 1820. Respective glass sheets 1822 and 1824 are suitably on the order of one to five millimeters in thickness, and most preferably in the range of about 2.3 millimeters thick.

As best seen in FIG. 18, it is desirable that glass sheet 1822 comprise rectangular dimensions on the order 14⅞" in height by 7⅞" wide, and for respective film sheets 1806, 1804, and 1802 to exhibit successively smaller rectilinear dimensions, with glass sheet 1824 having the smallest rectangular dimensions. The various sheets can be stacked on top of one another and conveniently manipulated by the operator during assembly.

With continued reference to FIG. 18, the first active layer of the LCF is suitably placed on top of glass sheet 1822. Specifically, back sheet 1806 is disposed on top of glass sheet 1822, with respect of opaque strips 1806A, 1806B, and the like running from left to right as viewed by the operator 1116. In a particularly preferred embodiment, the film comprising respective sheets 1802–1806 is Kodak Accumax 2000 AL17. In a preferred embodiment, respective sheets 1802–1806 are on the order of 7 mils. thick, and suitably comprised polyester, acetate, or any convenience transparent material.

In accordance with the further aspect of the present invention, the respective opaque lines comprising the various sheets within the laminate are suitably on the order of 12 mils. in width (dimension W1; see FIG. 14), with spaces on the order of 11 mils, such that that duty cycle of the various light block films are in the range of 40% to 60%, and preferably in the range of 50% to 60%. In addition, the emulsin which comprises the opaque stripes may be imbedded within the thickness of the film or, alternatively, may be deposited on the surface of the film at a thickness of approximately 6 microns.

After positioning film sheet 1806 on top of glass sheet 1822, film sheet 1806 is suitably secured to the glass sheet, for example by wiping a hypodermic needle across the tip of a bottle of Locktite™ Unlocktite 351, or any other suitable general purpose ultraviolet (UV) adhesive.

The adhesive is then wiped onto the underside of two or more corners of film 1806, and a UV light applied to the adhesive region to cure the adhesive, thereby securing film sheet 1806 to glass sheet 1822.

In accordance with the preferred embodiment, a suitably ultraviolet curing lamp comprises a 100 watt UV flood lamp, for example a Spectronics SB 100C hand held UV lamp.

Core sheet 1804 is this placed on top of back sheet 1806, with the opaque lines running from left to right. In order to properly position core sheet 1804 on top of back sheet 1806, the operator suitably looks directly downwardly toward the film, such that the operators line of vision is substantially orthogonal to the film plane. Sheet 1804 is then manipulated until the opaque lines of sheet 1804 are in registration with the opaque lines of sheet 1806, such that sheet 1806 is essentially hidden behind sheet 1804. Once the two sheets are exactly aligned, any air between the sheets is suitably wiped out to provide for intimate sliding contact between the two film sheets. Through the use of small portable microscopes, for example, a Tasco 30X microscope available from the H&R catalogue, core film 1804 is suitably slid toward the operator slightly (downwardly in FIG. 18), so that the opaque lines of sheet 1804 overlap the opaque lines of sheet 1806 by approximately 50%. Though the use of the aforementioned microscopes, this may be accomplished visually with relative ease. By using the microscopes at the four corners of the composite, it is also relatively easy to ensure that the opaque lines of sheet 1804 are substantially parallel to the opaque lines of sheet 1806 throughout the entire surface of the sheet. In this position, an exemplary edge 1826 of an arbitrary opaque line of sheet 1804 is suitably disposed approximately one half way between respective edges 1828 and 1830 of an adjacent opaque line 1806B on sheet 1806.

Core sheet 1804 is then temporarily taped in place, for example by placing two pieces of tape at the bottom edge of sheet 1804, temporarily securing sheet 1804 to film sheet 1806 and glass sheet 1822.

Front sheet 1802 is then placed on top of core sheet 1804, such that the various opaque lines 1802A, 1802B, etc. are aligned with the opaque regions defined by the overlapping opaque lines of sheets 1804 and 1806. Sheet 1802 is then slowly urged slightly toward the operator (downwardly in FIG. 18) until all zero order light is completely blocked. This will be apparent to the operator in that all zero order light which passes through grating 112 and the various components set forth in FIG. 18 is totally blocked. To confirm that the zero order light is essentially totally blocked, the operator may turn the brightness level in the bulb disposed within the viewing apparatus to a maximum level.

Specifically, zero order light will be totally blocked when edge 1832 of opaque stripe 1802A is slightly above edge 1834 of an opaque stripe 1826 for each of the various opaque stripes comprising respective sheets 1802 and 1804. The degree of overlap between respective edges 1832 and respective edges 1834 may be conveniently defined as dimension L. In accordance with the preferred embodiment of the present invention, dimension L should be as small as possible while insuring complete blockage of zero order light.

As an additional step in confirming that sheet 1802 is properly positioned, the operator may lean forward over the assembly, such that he looks downwardly and rearwardly at the assembly, for example from position 1814B. From position 1814B, the operator can observe any "backlight" which may shine through LCF composite 1810. While the backlight will typically be substantially lower in intensity than the zero order light, it is nonetheless desirable to block as much backlight as possible; this may be accomplished by minimizing dimension L while insuring complete blockage of zero order light.

Front layer 1802 is then secured to layer 1804, for example by applying a few pieces of adhesive tape to fasten layer 1802 to layer 1804.

Having confirmed that all zero order light is blocked, one or both of sheets 1802 and 1804 may be moved slightly to achieve optimum color balance. In this regard, the operator may step away from the assembly, and/or bend down slightly, such that he observes the assembly from position 1814A such that he is "looking up" the tunnel defined by the series of opaque lines. In the configuration set forth in FIG. 18, it is possible to observe what appears to be a comet, which the present inventor believes to be a scattered image of the filament of the source light within the viewing apparatus.

The operator then urges core layer 1804 toward him (downwardly in FIG. 18), while maintaining sheet 1802 essentially stationary. This manipulation effectively increases dimension L, further insuring total zero order blockage. Alternatively, front sheet 1802 may be urged upwardly in FIG. 18, either in addition to or in lieu of urging layer 1804 downwardly, to effect a slight increase in dimension L without increasing the amount of backlight observed from position 1814B.

An exemplary hologram may then be placed on top of the assembly to insure proper color and zero order blockage. To the extent that the operator desires to fine tune the color spectrum passing through LCF 1810, he may manipulate core layer 1804 upwards or downwards slightly, while insuring complete zero order blockage, to obtain desired variations in color.

Once the three layers comprising LCF 1810 are properly positioned, they are secured to one another at their corners through the aforementioned UV adhesive. Glass plate 1824 is then placed on the assembly, and the enlarge planar pressing tool is placed on the entire assembly to expel air from between the various laminates in the assembly. A bead of UV cement is then applied around the perimeter of the assembly, leaving a small gap in the perimeter bead. A hypodermic needle is then inserted into the gap, which hypodermic needle suitably comprises a 303 stainless steel, 25 gauge, thin wall tube.

The peripheral, adhesive bead is then completed, essentially completing the perimeter seal with the hypodermic needle in place. A vacuum lead, for example a teflon hose, is then secured to the distal end of the hypodermic needle, and a vacuum, on the order of 25 inches of mercury pressure, is applied to the hypodermic. This insures that any residual air within the laminated assembly is withdrawn through the hypodermic.

When all air is withdrawn from the assembly, a hot lamp or blow torch may be used to soften the hypodermic, such that the hypodermic collapses upon itself, creating an airtight region inside the adhesive bead. During the heating process, the hypodermic needle is suitably squeezed with needle-nosed pliers to flatten it out and may be advantageously gripped with channel grip pliers to insure a strong, light, mechanical airtight seal. The end of the hypodermic needle is then folded back into the adhesive bead, and the entire perimeter of the assembly is taped to insure a stable, air tight, mechanically sound composite laminate structure.

Modifications and Enhancements

When a hologram (H2), produced in accordance with the present invention, is mounted on box 1102, a three-dimensional representation of the object may be seen, affording the viewer full parallax and perspectives from all viewpoints. The present inventor has further determined that the hologram may be removed from the viewbox, inverted, and placed back on the viewbox. The inverted hologram contains all of the same data as the noninverted view of the same hologram, except that the observer is looking at the hologram from the opposite direction; that is, points on the hologram which previously were furthest away from the observer are now closest to the observer, and vice versa. This feature may be particularly useful to physicians when mapping out a proposed surgical procedure, for example, by allowing the physician to assess the various pros and cons of operating on a body part from one direction or the other.

The present inventor has also determined that two or more holograms may be simultaneously viewed on the same viewbox, simply by placing one hologram on top of the other hologram. This may be particularly significant in circumstances where, for example, the first hologram comprises a body part (e.g., hip) which is to be replaced, and the second hologram comprises the prosthetic replacement device. The physician may thus view the proposed device in proper context i.e., as the device would be implanted in the three-dimensional space within the patient.

Moreover, it may be advantageous to overlay a hologram of a coordinate grid, e.g., a three-dimensional coordinate grid, with the hologram which is the subject of inspection. In this context, a suitable coordinate grid may simply comprise a hologram of one or more rulers or other measuring devices having spatial indicia encoded thereon. Alternatively, the coordinate grid may simply comprise a series of intersecting lines or, alternatively, a matrix of dots or other visual markings spaced apart in any convenient manner, for example linearly, logarithmically, and the like. In this way, three-dimensional distances may be easily computed by counting the coordinate markings, particularly if the coordinate grid is of the same scale or of a convenient multiple of the dimensional scale comprising the hologram.

The present inventor has also observed that very faint patterns of light and dark rings are occasionally visible when viewing a hologram in accordance with the present invention. More particularly, these rings appear to be a hologram when viewed the hologram when viewed. The present inventor theorizes that these rings constitute an interferogram, which results from taking a "hologram" of diffusing diffuser 472 along with each data slice. To overcome this problem, diffuser 472 may be shifted slightly (e.g., ten millimeters) within its own plane after each data slice is recorded. In this way, the image corresponding to each data slice is still projected onto film 319 as described herein, yet a slightly different portion of diffuser 472 is projected for each data slice, thereby avoiding projection the same pattern attributable to diffuser 472 for each data slice.

It is also possible to add textual or graphical material for example to one or more data slices, thus permitting the resulting hologram of the data set to reflect this textual or graphic material. Such material may comprise identification data (e.g., patient name, model or serial number of the object being recorded), or may comprise pure graphical information (arrows, symbol and the like).

In this regard, it is interesting to note that text which is viewed in the orthoscopic view will be inverted in the pseudoscopic view of the same hologram; that is, if text appears right-side up in the orthoscopic view, it will appear upside down in the pseudoscopic view. Thus, to the extent it is desirable to utilize text within a hologram, it may be advantageous to insert the same text right-side up at the top of the hologram and upside down at the bottom of the hologram, so that text may be properly observed regardless of whether the hologram is viewed in the orthoscopic or pseudoscopic construction.

Moreover, text which is in the film plane will generally appear sharp during replay, whereas text disposed out of the film plane, i.e., along axis A in FIG. 1, generally appears less sharp. This may be advantageous in accordance with one aspect of the invention, inasmuch as "out of film plane" text would be legible when viewed on a Voxbox, but illegible without a Voxbox. In the context of holograms used for medical diagnosis, it may thus be desirable to place confidential patient information, for example a patient's name, condition, and the like, out of the film plane so that such information may be most easily viewed by proper personnel with the aid of a Voxbox, thereby ensuring patient confidentiality.

In addition to textual and graphical material, it may be desirable to include additional images, for example a portion of the image comprising a particular hologram, or image data from other holograms, onto a master hologram. For example, consider a master hologram of a fractured bone comprising one hundred or more slices. For the few slices which comprise the key information, it may be desirable to separately display this data spaced apart from the overall hologram, yet adjacent to the hologram and at the proper depth with respect to the hologram.

As briefly discussed above, wherein, a hologram produced in accordance with the present invention is viewed on a Voxbox or other suitable viewing device, the orthoscopic view of the hologram may be observed when the hologram is in a first position, and the pseudoscopic view may be observed when the hologram is rotated about its horizontal axis. Since it may be difficult to determine whether a particular orientation of the holographic film corresponds to the orthoscopic or pseudoscopic view with the naked eye, it may be desirable to place convenient indicia on the holographic film to inform the viewer as to which view of the hologram may be observed when the holographic film is placed on a viewing apparatus. For example, it may be desirable to place a notch or other physical indicium on the film, for example in the upper right hand corner of the orthoscopic view. Alternatively, a small textual graphical or color coded scheme may be employed by placing appropriate indicia at a corner, along an edge, or at any convenient position on a holographic film or on any border, frame, or packaging therefor.

In accordance with another aspect of the present invention, it may be efficient to window only a portion of the data slices and nonetheless achieve satisfactory contrast and shading. For example, for a 100 slice data set, it may be possible to manually window every tenth data slice, for example, and through the use of computerized interpolation techniques, automatically window the interstitial data slices.

In accordance with a further aspect of the present invention, it is possible to select the film plane among the various data slice planes comprising the data set. More particularly, each data slice within a data set occupies its own unique plane. In accordance with the preferred embodiment of the present invention, track assembly 334 is moved forward or backward such that the data slice which is centered within the volume of the data set corresponds to the data slice centered within the length of travel of track assembly 334. The relative position of imaging assembly 328 and film 319 may be varied, however, so that the plane of film 319 is located nearer to one end of the data set or the other, as desired. The resulting hologram H2 will thus appear to have a greater or lesser portion of the holographic image projected into or out of the screen upon which the hologram is observed, depending on the position that the film plane has been selected to cut through the data set.

In accordance with a further aspect of the invention, a plurality of different holograms may be displayed on a single sheet. For example, a hologram of a body part before surgery may be displayed on the upper portion of a film, with the lower portion of the film being divided into two quadrants, one containing a hologram of the same body part after surgery from a first perspective, and the other portion containing a view of the same body part after surgery from another perspective. These and other holographic compositions may be suitably employed to facilitate efficient diagnostic analysis.

In accordance with a further aspect of the present invention, the entire beam path is advantageously enclosed within black tubing or black boxes, as appropriate. This minimizes the presence of undesirable reflections.

Moreover, the entire process of maker master and copy holograms is advantageously carried out in a room or other enclosure which is devoid of spurious light which could contact any film surface. Alternatively, the path travelled by any of the beams in the context of the present invention may be replaced with fiber optic cable. By proper selection of the fiber optic cable, the polarization and Transverse Electromagnetic Mode (TEM) of the light travelling through the cable is preserved. Use of fiber optic cable permits the system to be highly compressed, and further permits the elimination of many of the components of the system entirely (e.g., mirrors). Finally, fiber optic cables may be used to compensate for a differential path length between the reference beam and the object beam. Specifically, to the extent the path travelled by one of the beams differs from the other, a predetermined length of fiber optic cable may be employed in the path of the beam travelling the shorter length to compensate for this difference in length and, hence, render the two paths equal.

Returning briefly to the pseudoscopic construction shown in FIG. 10B, it may be desirable under certain circumstances to replay the master hologram and view the three-dimensional image in free space. For example, it may be beneficial to a surgeon to rehearse a surgical technique on a particular body part prior to performing the surgery. In this regard, a 6 space digitizer, for example a Bird™ part no. 600102-A manufactured by the Ascension Technology Corporation of Burlington, Vt., may be advantageously employed in the context of a pseudoscopic construction.

More particularly, a 6 space digitizer is capable of being manipulated in free space, and reporting its position to a computer, much like a conventional computer mouse reports two-dimensional position data to its computer. By moving through the holographic space, size and other dimensional data may be unambiguously obtained with respect to the hologram.

With continued reference to FIG. 10B, it may also be desirable to replay a hologram partially or wholly out of its film plane, for example in free space, in order to perform various diagnostic and experimental tasks. For example, it may be advantageous to project a holographic display of a portion of human anatomical structure, for example an injured hip, and to physically place into the holographic space a prosthetic device intended to replace the hip or other anatomical element. In this way, the "fit" of the prosthetic device may be ascertained and any appropriate corrections made to the prosthetic device prior to implanting the device.

In addition, it may be desirable to replay a hologram in free space and place a diffusing screen or other transparent or opaque structure into the holographic space to permit interaction with the subject matter of the hologram for various experimental and diagnostic purposes.

Although the invention has been described herein on conjunction with the appended drawings, those skilled in the art will appreciate that the scope of the invention is not so limited. For example, while the view box has been described as being rectangular, those skilled in the art will appreciate that any suitably mechanical configuration which conveniently houses the various components of the viewing apparatus will suffice. Moreover, although the camera and copy assemblies are illustrated as separate systems, they may suitably be combined into a single system.

These and other modifications in the selection, design, and arrangement of the various components and steps discussed herein may be made without departing from the spirit of the invention as set forth in the appended claims.

We claim:

1. A laminated light control film assembly for use in a hologram viewing apparatus including a diffraction grating comprising:
    a black film sheet having a first series of alternating opaque and transparent parallel lines;
    a core film sheet disposed on top of said back sheet, said core sheet having a second series of alternating opaque and transparent parallel lines; and
    a front sheet disposed on top of said core sheet such that said core sheet is interposed between said front sheet and said back sheet, said front sheet having a third series of alternating transparent and opaque parallel lines;
    wherein said core sheet, said back sheet, and said front sheet are positioned with respect to one another to substantially block zero order light from passing through the assembly, while facilitating passage therethrough of a predetermined band width of first order light produced by said diffraction grating.

2. The assembly of claim 1, wherein for at least one of said series of lines, the width of each of said opaque lines is substantially equal to the width of each of said transparent lines.

3. The assembly of claim 1, wherein said back, core, and front sheets are configured such that shifting of said front sheet with respect to said core sheet and said back sheet along a direction orthogonal to said parallel lines controls the color selectivity of said assembly.

4. The assembly of claim 1, wherein said back, said core, and said front sheet are arranged with respect to one another such that a shift of said front sheet with respect to said core sheet and said back sheet produces a corresponding change in the band width of said predetermined band width of first order light which passes through said assembly.

5. The assembly of claim 1, wherein said back, said core, and said front sheets are configured such that a small movement of said core sheet with respect to said back sheet in a direction substantially orthogonal to said parallel lines controls the degree of blockage of zero order light through said assembly.

6. The assembly of claim 1, wherein said first, said second, and said third series of lines are configured such that small movements of said front sheet with respect to the other sheets along a direction orthogonal to said lines controls the color selectivity of said assembly in a manner which is substantially decoupled from the ability of said assembly to block the passage of zero order light.

7. The assembly of claim 1, further comprising a light source disposed to illuminate said assembly, and wherein said diffraction grating is interposed between said light source and said assembly.

8. A laminated light control film assembly, comprising:
    a back film sheet having a first series of alternating opaque and transparent parallel lines extending across the surface thereof;
    a front sheet having a third series of alternating transparent and opaque lines extending across the surface thereof; and
    a core film sheet disposed intermediate said back film sheet and said front sheet, said core sheet having a second series of alternating opaque and transparent lines extending across the surface thereof;
    wherein said first, second, and third series of lines are arranged with respect to one another such that light traveling in a direction substantially orthogonal to the plane of the assembly is substantially impeded from passing through said assembly, and further wherein a predetermined band width of light is configured to pass through said assembly, said predetermined band width defining a predetermined angle of incidence with respect to the plane of said assembly.

9. The assembly of claim 8, wherein each of said opaque lines of said first series are of substantially the same width, each of said opaque said lines of said second series are of substantially the same width, and each of said opaque lines of said third series are approximately the same width.

10. The assembly of claim 9, wherein the duty cycle of at least one of said core, said front, and said back sheets is approximately fifty percent (50%).

11. The assembly of claim 8, wherein the opaque lines of at least one of said first, second, and third series are suitably on the order a 12 mils in width, with corresponding spaces on the order of 11 mils in width.

12. The assembly of claim 11, wherein the duty cycle of each of said front, core, and back sheets is in the range of forty (40%) to sixty (60%) percent.

13. The assembly of claim 8, wherein each of said front, said core, and said back sheets are on the order of 7 mils thick.

14. The assembly of claim 8, wherein each of said front, said back, and said core sheets comprise one of polyester and acetate.

15. A method of assembling a composite light control film laminate for use in conjunction with a light source and a diffraction grating interposed between said light source and said laminate useful in viewing holograms, comprising the steps of:

providing a first light control film sheet comprising a first series of alternating opaque and transparent lines extending across the surface of said first sheet;

providing a second sheet on top of said first sheet, said second sheet comprising a second series of alternating opaques and transparent lines extending across the surface of said second sheet;

manipulating said second sheet with respect to said first sheet such that said opaque lines of said first series overlap said opaque lines of said second series by approximately fifty percent (50%);

disposing a third sheet, having a third series of alternating opaque and transparent lines, on top of said second sheet;

manipulating said third sheet until substantially all zero order light is blocked by the combination of said first, said second, and said third sheets; and thereafter manipulating one or both of said second and third sheets, while maintaining parallelism among said first, second, and third series of lines, to achieve predetermined wavelength selectivity of the first order light which passes through said laminate.

16. The method of claim 15, further comprising the step of urging said second layer in a direction substantially orthogonal to said second series of opaque lines, while maintaining said third sheet essentially stationary, to maximize the blockage of zero order light.

17. The method of claim 15, further comprising the step of removing substantially all of the air from between said first and said second sheets and from between said second and third sheets.

18. The method of claim 15, further comprising the step of immovably securing said first, second, and third sheets together once predetermined color selectivity and optimum zero order blockage are achieved.

* * * * *